(12) United States Patent
Wittkopf et al.

(10) Patent No.: US 12,017,406 B2
(45) Date of Patent: Jun. 25, 2024

(54) THREE-DIMENSIONAL PRINTING

(71) Applicant: Hewlett-Packard Development Company, L.P., Spring, TX (US)

(72) Inventors: Jarrid A. Wittkopf, Palo Alto, CA (US); Kristopher J. Erickson, Palo Alto, CA (US); Lihua Zhao, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 193 days.

(21) Appl. No.: 17/288,552

(22) PCT Filed: Apr. 29, 2019

(86) PCT No.: PCT/US2019/029705
§ 371 (c)(1),
(2) Date: Apr. 25, 2021

(87) PCT Pub. No.: WO2020/222762
PCT Pub. Date: Nov. 5, 2020

(65) Prior Publication Data
US 2022/0040918 A1    Feb. 10, 2022

(51) Int. Cl.
*B29C 41/22*   (2006.01)
*B29C 64/112*  (2017.01)
(Continued)

(52) U.S. Cl.
CPC .......... *B29C 64/165* (2017.08); *B29C 70/882* (2013.01); *B33Y 10/00* (2014.12);
(Continued)

(58) Field of Classification Search
CPC ............ B29C 2035/0827; B29C 41/22; B29C 64/112; B29C 70/882; B29C 2795/005;
(Continued)

(56) References Cited

U.S. PATENT DOCUMENTS

2007/0241482 A1    10/2007  Giller et al.
2014/0036455 A1*    2/2014  Napadensky ......... B29C 64/112
                                                   174/250
(Continued)

FOREIGN PATENT DOCUMENTS

FR            3052698 A1    12/2017
WO     WO-2015136277 A1     9/2015
(Continued)

OTHER PUBLICATIONS

Hiroki Ota et al. "Application of 3D Printing for Smart Objects with Embedded Electronic Sensors and Systems." Advanced Materials Technologies, 1.1 (2016).
(Continued)

*Primary Examiner* — Leo B Tentoni
(74) *Attorney, Agent, or Firm* — Dierker & Kavanaugh, P.C.

(57) ABSTRACT

In an example 3D printing method, an electrical conductivity value for a resistor is identified. Based upon the identified electrical conductivity value, a predetermined amount of a conductive agent is selectively applied to at least a portion of a build material layer in order to introduce a predetermined volume percentage of a conductive material to the resistor. Based upon the identified electrical conductivity value and the predetermined volume percent of the conductive material, a predetermined amount of a resistive agent is selectively applied to the at least a portion of the build material layer in order to introduce a predetermined volume percentage of a resistive material to the resistor. The build material layer is exposed to electromagnetic radiation, whereby the at least the portion coalesces to form a layer of the resistor.

12 Claims, 6 Drawing Sheets

(51) Int. Cl.
  *B29C 64/165* (2017.01)
  *B29C 70/88* (2006.01)
  *B33Y 10/00* (2015.01)
  *B33Y 70/00* (2020.01)
  *H01C 17/065* (2006.01)
  *B29C 35/08* (2006.01)
  *B29K 105/16* (2006.01)
  *B29K 505/00* (2006.01)
  *B29L 31/34* (2006.01)

(52) U.S. Cl.
  CPC ........ *B33Y 70/00* (2014.12); *H01C 17/06526* (2013.01); *B29C 2035/0827* (2013.01); *B29C 2795/005* (2013.01); *B29K 2105/162* (2013.01); *B29K 2505/00* (2013.01); *B29K 2995/0005* (2013.01); *B29K 2995/0006* (2013.01); *B29K 2995/0007* (2013.01); *B29L 2031/3406* (2013.01); *B29L 2031/3487* (2013.01)

(58) Field of Classification Search
  CPC .... B29K 2995/0005; B29K 2995/0006; B29K 2995/0007; B29L 2031/3487; B33Y 10/00
  USPC .......................... 264/104, 129, 255, 308, 494
  See application file for complete search history.

(56) References Cited

U.S. PATENT DOCUMENTS

| | | |
|---|---|---|
| 2015/0197063 A1 | 7/2015 | Shinar et al. |
| 2017/0015065 A1 | 1/2017 | Potter et al. |
| 2018/0009982 A1 | 1/2018 | Steele et al. |

FOREIGN PATENT DOCUMENTS

| | | |
|---|---|---|
| WO | WO-2017180169 A1 | 10/2017 |
| WO | WO-2018022034 A1 | 2/2018 |

OTHER PUBLICATIONS

Patrick F. Flowers et al."3D printing electronic components and circuits with conductive thermoplastic filament." Additive Manufacturing 18 (2017): 156-163.

* cited by examiner

THREE-DIMENSIONAL PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material, and the mechanism for material coalescence may depend upon the type of build material used. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
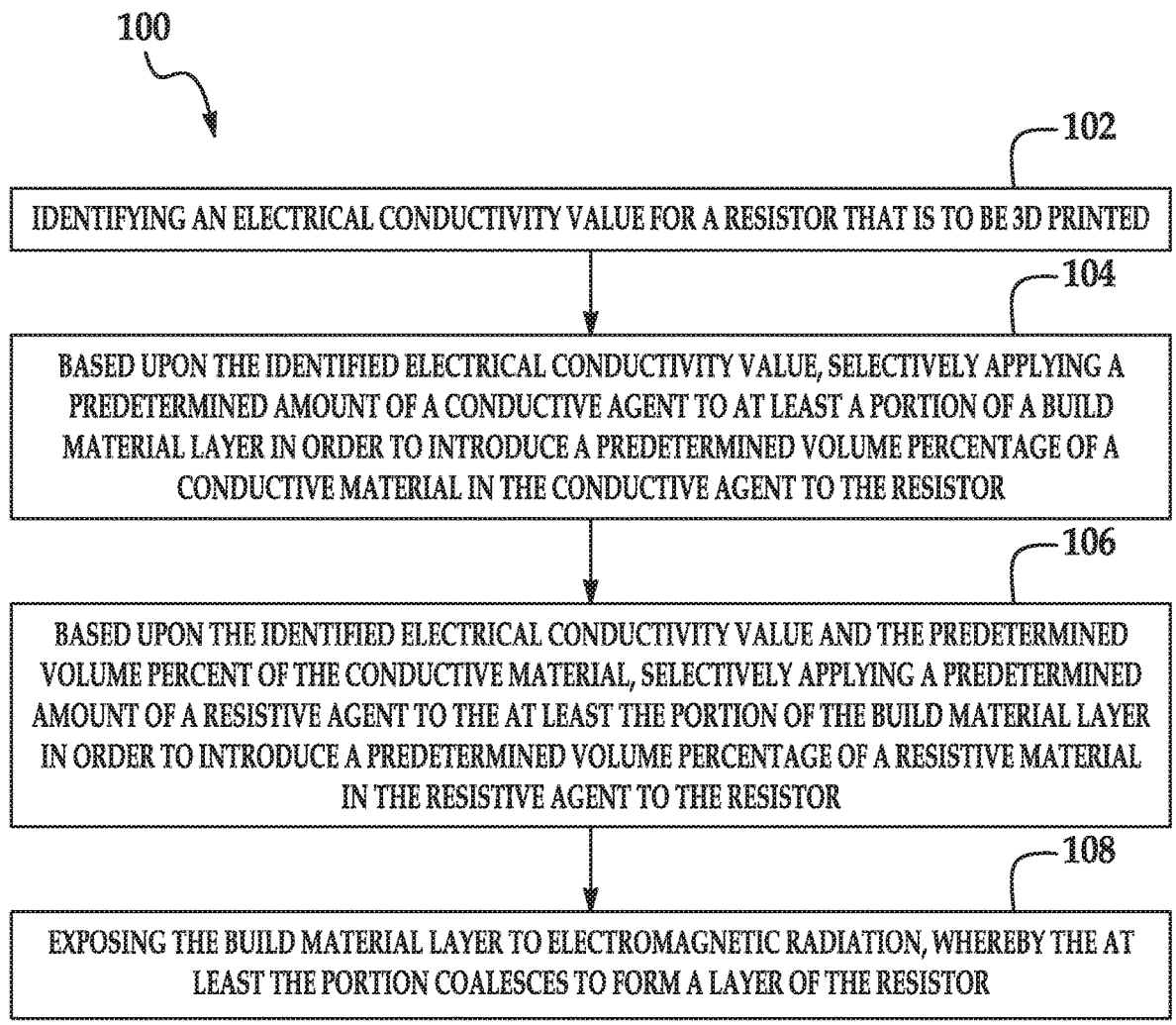
FIG. 1 is a flow diagram illustrating an example of a 3D printing method.

Examples of the three-dimensional (3D) printing methods disclosed herein may be used to generate resistors with desired electrical conductivity values. A conductive agent including a conductive material and a resistive agent including a resistive material are each selectively applied on polymeric build material layer(s) to introduce, respectively, a predetermined volume percentage of the conductive material and a predetermined volume percentage of a resistive material to the resistor. The predetermined volume percent of the conductive material and the predetermined volume percent of the resistive material impart the desired electrical conductivity value.

Some examples of three-dimensional (3D) printing disclosed herein may also utilize a fusing agent (including an energy absorber) to pattern the polymeric build material. In these examples, an entire layer of the polymeric build material is exposed to radiation, but the patterned region (which, in some instances, is less than the entire layer) of the polymeric build material is coalesced/fused and hardened to become a layer of a 3D object. In the patterned region, the fusing agent is capable of at least partially penetrating into voids between the polymeric build material particles, and is also capable of spreading onto the exterior surface of the polymeric build material particles. This fusing agent is capable of absorbing radiation and converting the absorbed radiation to thermal energy, which in turn coalesces/fuses the polymeric build material that is in thermal contact (e.g., direct contact, through thermal diffusion, etc.) with the fusing agent. As will be described in further detail herein, in some of these examples, the conductive material and/or the resistive material may act as the energy absorber, and as such, the conductive agent and/or the resistive agent may act as the fusing agent. As also will be described in further detail herein, in others of these examples, the conductive agent, the resistive agent, and the fusing agent may each be applied as separate agents.

Other examples of 3D printing disclosed herein may utilize selective laser sintering (SLS). During selective laser sintering, a laser beam is aimed at a selected region (which, in some instances, is less than the entire layer) of a layer of the polymeric build material. Heat from the laser beam causes the polymeric build material under the laser beam to fuse. As will be described in further detail herein, in these examples, the conductive agent and the resistive agent may be selectively applied at areas that are exposed to the laser beam and where a resistor is desired.

Coalescing/fusing (through the use of (i) the fusing agent and radiation exposure, or (ii) the laser beam) causes the polymeric build material to join or blend to form a single entity (i.e., the layer of the 3D object). Coalescing/fusing may involve at least partial thermal merging, melting, binding, and/or some other mechanism that coalesces the polymeric build material to form the layer of the 3D object.

Throughout this disclosure, a weight percentage that is referred to as "wt % active" refers to the loading of an active component of a dispersion or other formulation that is present in the conductive agent, resistive agent, and/or fusing agent. For example, an energy absorber, such as carbon black, may be present in a water-based formulation (e.g., a stock solution or dispersion) before being incorporated into the fusing liquid. In this example, the wt % actives of the carbon black accounts for the loading (as a weight percent) of the carbon black solids that are present in the fusing agent, and does not account for the weight of the other components (e.g., water, etc.) that are present in the stock solution or dispersion with the carbon black. The term "wt %," without the term actives, refers to either i) the loading (in the conductive agent, resistive agent, fusing agent, or detailing agent) of a 100% active component that does not include other non-active components therein, or ii) the loading (in the conductive agent, resistive agent, fusing agent, or detailing agent) of a material or component that is used "as is" and thus the wt % accounts for both active and non-active components.

Conductive Agents

The 3D printing method disclosed herein includes the conductive agent. The conductive agent includes the conductive material. When the conductive agent is used with the resistive agent in a 3D printing process, the conductive material and the resistive material (from the resistive agent) may impart a desired electrical conductivity value to specific portions of the 3D object or to the entire 3D object.

Conductive Materials

It is to be understood that the conductivity of the conductive material is greater than the conductivity of the resistive material of the resistive agent. The bulk conductivity of the conductive material may be determined by forming a part, where the conductive material makes up a fraction of the part and the balance of the part is a polymer matrix. The resistance across the part may be measured, and the conductivity of the part may be calculated from the resistance, the length of the part, and the cross sectional area of the part (1/conductivity=resistance x area/length). Then the conductivity of the part may be normalized to the fraction of the part that is made up by the conductive material to determine the bulk conductivity of the conductive material.

In some examples, the conductive material may be in the form of nanoparticles. In these examples, the particle size of the conductive material may minimize the settling of the conductive material in a liquid vehicle of the conductive agent. The conductive material may have a particle size ranging from about 1 nm to about 200 nm. In one example, the conductive material has a particle size ranging from about 1 nm to about 100 nm. In another example, the conductive material has a particle size ranging from about 1 nm to about 50 nm. In yet another example, the conductive material has a particle size ranging from about 1 nm to about 30 nm. In still another example, the conductive material has a particle size ranging from about 4 nm to about 15 nm. The term "particle size", as used herein, may refer to a number-weighted mean diameter or a volume-weighted mean diameter of a particle distribution.

In some examples, the conductive material may be an energy absorber. In these examples, the conductive material may absorb energy at wavelengths ranging from 300 nm to 4000 nm. As used herein, "absorption" means that at least 30% of radiation having wavelengths within the specified range is absorbed at a specified deposition level of the conductive material. In these examples, the conductive agent may act as the fusing agent.

In some other examples, the conductive material is not an energy absorber. In these examples, the resistive agent may act as the fusing agent and/or a separate fusing agent may be used. In these examples, the conductive material may also or alternatively reflect the wavelengths of the applied radiation, which generates secondary radiation that can be absorbed by the polymeric build material composition, resistive agent, fusing agent, etc.

In still some other examples, the conductive agent may act as a fusing agent, and the resistive agent may act as a fusing agent and/or a separate fusing agent may be used. In these examples, the conductive material may be an energy absorber, but the absorptivity of the conductive material and/or the amount of the conductive material used may not be sufficient to absorb enough energy for coalescence/fusing.

In some examples of the 3D printing method, the conductive material is selected from the group consisting of silver nanoparticles, copper nanoparticles, gold nanoparticles, platinum nanoparticles, nickel nanoparticles, palladium nanoparticles, iron nanoparticles, chromium nanoparticles, aluminum nanoparticles, and combinations thereof. In one of these examples, the conductive material consists of silver nanoparticles.

The conductive material may be present in the conductive agent in an amount that allows the conductive agent to efficiently introduce the conductive material to the resistor. The conductive material may also be present in the conductive agent in an amount that allows the conductive agent to jettable via thermal or piezoelectric printing. In some examples, the conductive material may be present in the conductive agent in an amount ranging from about 1 wt % to about 65 wt %, based on a total weight of the conductive agent. In other examples, the conductive material may be present in the conductive agent in an amount ranging from about 5 wt % to about 55 wt %, from about 10 wt % to about 50 wt %, from about 15 wt % to about 45 wt %, or from about 35 wt % to about 55 wt %, based on a total weight of the conductive agent.

Liquid Vehicles

The conductive agent includes a liquid vehicle in addition to the conductive material. In some of these examples, the conductive agent consists of the conductive material and the liquid vehicle. In others of these examples, the conductive agent may include additional components.

As used in reference to the conductive agent, the term "liquid vehicle" may refer to the liquid in which the conductive material is dispersed to form the conductive agent. A wide variety of vehicles, including aqueous and non-aqueous vehicles, may be used in the conductive agent.

In some examples, the liquid vehicle of the conductive agent may include water or a non-aqueous solvent (e.g., ethanol, acetone, n-methyl pyrrolidone, aliphatic hydrocarbons, etc.) alone with no other components. In other examples, the liquid vehicle may include other components, depending, in part, upon the applicator that is to be used to dispense the conductive agent. Examples of other suitable conductive agent components include co-solvent(s), humectant(s), surfactant(s), antioxidant(s), antimicrobial agent(s), anti-kogation agent(s), chelating agent(s) and/or buffer(s).

In an example, the liquid vehicle of the conductive agent includes a co-solvent, a surfactant, and a balance of water. In another example, the liquid vehicle of the conductive agent consists of a co-solvent, a surfactant, and a balance of water. In still another example, the liquid vehicle of the conductive agent consists of a co-solvent, a surfactant, an additive selected from the group consisting of a humectant, an antioxidant, an antimicrobial agent, an anti-kogation agent, a chelating agent, a buffer, and a combination thereof, and a balance of water.

Classes of organic solvents or co-solvents that may be used in the conductive agent include aliphatic alcohols, aromatic alcohols, diols, glycol ethers, polyglycol ethers, lactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, 2-pyrrolidone, 1-methyl-2-pyrrolidone, N-(2- hydroxyethyl)-2-pyrrolidone, both substituted and unsubstituted formamides, both substituted and unsubstituted acetamides, and the like. Other examples of organic solvents or co-solvents include dimethyl sulfoxide (DMSO), isopropyl alcohol, ethanol, pentanol, acetone, or the like.

Some examples of suitable solvents or co-solvents include water-soluble high-boiling point solvents, which have a boiling point of at least 120° C., or higher. Some examples of high-boiling point solvents include 2-pyrrolidone (i.e., 2-pyrrolidinone, boiling point of about 245° C.), 1-methyl-2-pyrrolidone (boiling point of about 203° C.), N-(2-hydroxyethyl)-2-pyrrolidone (boiling point of about 140° C.), 2-methyl-1,3-propanediol (boiling point of about 212° C.), and combinations thereof.

The co-solvent(s) may be present in the conductive agent in a total amount ranging from about 1 wt % to about 50 wt % based upon the total weight of the conductive agent, depending upon the jetting architecture of the applicator. In an example, the total amount of the co-solvent(s) present in the conductive agent is about 5 wt % based on the total weight of the conductive agent. In another example, the total amount of the co-solvent(s) present in the conductive agent is about 20 wt % based on the total weight of the conductive agent.

The liquid vehicle may also include humectant(s). In an example, the total amount of the humectant(s) present in the conductive agent ranges from about 3 wt % active to about 10 wt % active, based on the total weight of the conductive agent. An example of a suitable humectant is ethoxylated glycerin having the following formula:

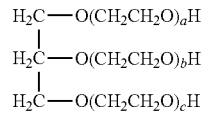

in which the total of a+b+c ranges from about 5 to about 60, or in other examples, from about 20 to about 30. An example of the ethoxylated glycerin is LIPONIC® EG-1 (LEG-1, glycereth-26, a+b+c=26, available from Lipo Chemicals).

In some examples, the liquid vehicle includes surfactant(s) to improve the jettability of the conductive agent. Examples of suitable surfactants include a self-emulsifiable, non-ionic wetting agent based on acetylenic diol chemistry (e.g., SURFYNOL® SEF from Evonik Degussa), a non-ionic fluorosurfactant (e.g., CAPSTONE® fluorosurfactants, such as CAPSTONE® FS-35, from Chemours), and combinations thereof. In other examples, the surfactant is an ethoxylated low-foam wetting agent (e.g., SURFYNOL® 440 or SURFYNOL® CT-111 from Evonik Degussa) or an ethoxylated wetting agent and molecular defoamer (e.g., SURFYNOL® 420 from Evonik Degussa). Still other suitable surfactants include non-ionic wetting agents and molecular defoamers (e.g., SURFYNOL® 104E from Evonik Degussa) or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company or TEGO® Wet 510 (polyether siloxane) available from Evonik Degussa). Yet another suitable surfactant includes alkyldiphenyloxide disulfonate (e.g., the DOWFAX™ series, such a 2A1, 3B2, 8390, C6L, C10L, and 30599, from The Dow Chemical Company).

Whether a single surfactant is used or a combination of surfactants is used, the total amount of surfactant(s) in the conductive agent may range from about 0.01 wt % active to about 10 wt % active based on the total weight of the conductive agent. In an example, the total amount of surfactant(s) in the conductive agent may be about 0.75 wt % active based on the total weight of the conductive agent.

The liquid vehicle may include the antioxidant to prevent the oxidation of the conductive material and/or the oxidation of any organic stabilizer molecules. If the conductive material is oxidized, it may be unable to impart (in combination with the resistive material from the resistive agent) the desired electrical conductivity value due to a reduction in its conductivity.

It is believed that any antioxidant may be used. Some examples of the antioxidant include ascorbic acid, hydrazine, sodium borohydride, formic acid, oxalic acid, glycolic acid, maleic acid, malonic acid, aniline, sulfonamide, etc. Other examples of the antioxidant include dithionate ($Na_2S_2O_6$) and thiosulfates ($Na_2S_2O_3$). Still other examples of the antioxidant include reducing sugars (such as monosaccharides like glucose, fructose, galactose, etc.) due to their free aldehyde groups. Yet other examples of the antioxidant include phosphites ($P(OR)_3$) and TINUVIN® additives (ultraviolet light absorbers and hindered-amine light stabilizers, available from Ciba-Geigy Corp.). In some other examples, the antioxidant may include IRGANOX® 1098 (benzenepropanamide, N,N'-1,6-hexanediylbis(3,5-bis(1,1-dimethylethyl)-4-hydroxy)), IRGANOX® 254 (a mixture of 40% triethylene glycol bis(3-tert-butyl-4-hydroxy-5-methylphenyl), polyvinyl alcohol and deionized water), and/or other sterically hindered phenols. In still other examples, the antioxidant may include a phosphite and/or an organic sulfide (e.g., a thioester).

In some examples, the antioxidant may be present in the conductive agent in an amount ranging from about 0.05 wt % active to about 40 wt % active, based on the total weight of the conductive agent. In other examples, the antioxidant may be present in the conductive agent in an amount ranging from about 2 wt % active to about 20 wt % active, based on the total weight of the conductive agent. In still other examples, the antioxidant is present in the conductive agent in an amount of about 0.2 wt % active, based on the total weight of the conductive agent. The amount of the antioxidant present in the conductive agent may depend, in part, on the antioxidant used and/or the interaction between the antioxidant and the other components of the conductive agent. For example, when the antioxidant is hydrazine, a smaller amount of the antioxidant may be used (e.g., about 0.5 wt % active based on the total weight of the conductive agent). As another example, when the conductive agent includes co-solvent(s) that act as reducing agent(s), a larger amount of the antioxidant may be used (e.g., about 40 wt % active based on the total weight of the conductive agent).

An anti-kogation agent may be included in the conductive agent that is to be jetted using thermal inkjet printing. Kogation refers to the deposit of dried printing liquid (e.g., conductive agent) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS® 03A or CRODAFOS® N-3 acid from Croda), dextran 500k, CRODAFOS™ HCE (phosphate-ester from Croda Int.), CRODAFOS® N10 (oleth-10-phosphate from Croda Int.), DISPERSOGEN® LFH (polymeric dispersing agent with aromatic anchoring groups, acid form, anionic, from Clariant), or a combination of oleth-3-phosphate and a low molecular weight (e.g., <5,000) acrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the conductive agent may range from greater than 0.10 wt % active to about 1.5 wt % active based on the total weight of the conductive agent. In an example, the oleth-3-phosphate is included in an amount ranging from about 0.45 wt % active.

The liquid vehicle may also include antimicrobial agent(s). Suitable antimicrobial agents include biocides and fungicides. Example antimicrobial agents may include the NUOSEPT™ (Troy Corp.), UCARCIDE™ (The Dow Chemical Company), ACTICIDE® B20 (Thor Chemicals), ACTICIDE® M20 (Thor Chemicals), ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (The Dow Chemical Company), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from The Dow Chemical Company).

In an example, the conductive agent may include a total amount of antimicrobial agents that ranges from about 0.0001 wt % active to about 1 wt % active. In an example, the antimicrobial agent(s) is/are a biocide(s) and is/are present in the conductive agent in an amount of about 0.18 wt % active (based on the total weight of the conductive agent).

Chelating agents (or sequestering agents) may be included in the liquid vehicle to eliminate the deleterious effects of heavy metal impurities and/or to capture any soluble metal ions in the conductive agent. Examples of chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the conductive agent may range from greater than 0 wt % active to about 2 wt % active based on the total weight of the conductive agent. In an example, the chelating agent(s) is/are present in the conductive agent in an amount of about 0.08 wt % active (based on the total weight of the conductive agent).

The liquid vehicle may also include buffer(s). Examples of buffers include TRIS (tris(hydroxymethyl)aminomethane or TRIZMA®), bis-tris propane, TES (2-[(2-Hydroxy-1,1-bis(hydroxymethyl)ethyl)amino]ethanesulfonic acid), MES (2-ethanesulfonic acid), MOPS (3-(N-morpholino)propanesulfonic acid), HEPES (4-(2-hydroxyethyl)-1-piperazineethanesulfonic acid), DIPSO (3-(N,N-Bis[2-hydroxyethyl]amino)-2-hydroxypropanesulfonic acid), Tricine (N-[tris(hydroxymethyl)methyl]glycine), HEPPSO (β-Hydroxy-4-(2-hydroxyethyl)-1-piperazinepropanesulfonic acid monohydrate), POPSO (Piperazine-1,4-bis(2-hydroxypropanesulfonic acid) dihydrate), EPPS (4-(2-Hydroxyethyl)-1-piperazinepropanesulfonic acid, 4-(2-Hydroxyethyl)piperazine-1-propanesulfonic acid), TEA (triethanolamine buffer solution), Gly-Gly (Diglycine), bicine (N,N-Bis(2-hydroxyethyl)glycine), HEPBS (N-(2-Hydroxyethyl)piperazine-N'-(4-butanesulfonic acid)), TAPS ([tris(hydroxymethyl)methylamino]propanesulfonic acid), AMPD (2-amino-2-methyl-1,3-propanediol), TABS (N-tris (Hydroxymethyl)methyl-4-aminobutanesulfonic acid), or the like.

Whether a buffer is used or a combination of buffers is used, the total amount of buffer(s) in the conductive agent may range from greater than 0 wt % active to about 0.5 wt % active based on the total weight of the conductive agent. In an example, the buffer(s) is/are present in the conductive agent in an amount of about 0.1 wt % active (based on the total weight of the conductive agent).

The balance of the conductive agent is water or a non-aqueous solvent. As such, the amount of water or non-aqueous solvent may vary depending upon the amounts of the other components that are included. In an example, deionized water may be used. In other examples, a non-aqueous solvent, such as ethanol, acetone, n-methyl pyrrolidone, aliphatic hydrocarbons, etc., is used.

In some examples, the conductive agent is jettable via thermal inkjet printing, piezoelectric inkjet printing, continuous inkjet printing, or a combination thereof. As such, the liquid vehicle components may be selected to achieve the desired jettability. For example, if the conductive agent is to be jettable via thermal inkjet printing, water may make up 35 wt % or more of the conductive agent. For another example, if the conductive agent is to be jettable via piezoelectric inkjet printing, water may make up from about 25 wt % to about 30 wt % of the conductive agent, and 35 wt % or more of the conductive agent may be the organic co-solvent, such as ethanol, isopropanol, acetone, etc.

Resistive Agents

The 3D printing method disclosed herein includes the resistive agent. The resistive agent includes the resistive material. As mentioned above, when the resistive agent is used with the conductive agent in a 3D printing process, the resistive material and the conductive material (from the conductive agent) may impart a desired electrical conductivity value to a portion of a 3D object or to the entire 3D object.

Resistive Materials

It is to be understood that the conductivity of the resistive material is less than the conductivity of the conductive material of the conductive agent. The bulk conductivity of the resistive material may be determined by forming a part, where the resistive material makes up a fraction of the part and the balance of the part is a polymer matrix. The resistance across the part may be measured, and the conductivity of the part may be calculated from the resistance, the length of the part, and the cross sectional area of the part (1/conductivity=resistance x area/length). Then the conductivity of the part may be normalized to the fraction of the part that is made up by the resistive material to determine the bulk conductivity of the resistive material.

In some examples, the resistive material may have a particle size ranging from about 1 nm to about 200 nm. In these examples, the particle size of the resistive material may minimize the settling of the resistive material in a liquid vehicle of the resistive agent. In one example, the resistive material has a particle size ranging from about 1 nm to about 100 nm. In another example, the resistive material has a particle size ranging from about 1 nm to about 50 nm. In yet another example, the resistive material has a particle size ranging from about 1 nm to about 30 nm. In still another example, the resistive material has a particle size ranging from about 4 nm to about 15 nm. As mentioned above, the term "particle size", as used herein, may refer to a number-weighted mean diameter or a volume-weighted mean diameter of a particle distribution.

In other examples, the resistive material may be soluble in the vehicle of the resistive agent.

In some examples, the resistive material may be an energy absorber. In these examples, the resistive material may absorb energy at wavelengths ranging from 300 nm to 4000 nm. As mention above, "absorption" means that at least 30% of radiation having wavelengths within the specified range is absorbed at a specified deposition level of the resistive material. In these examples, the resistive agent may act as the fusing agent.

In some other examples, the resistive material is not an energy absorber. In these examples, the conductive agent may act as the fusing agent and/or a separate fusing agent may be used.

In still some other examples, the resistive agent may act as a fusing agent, and the conductive agent may act as a fusing agent and/or a separate fusing agent may be used. In these examples, the resistive material may be an energy absorber, but the absorptivity of the resistive material and/or the amount of the resistive material used may not be sufficient to absorb enough energy alone.

In some examples of the 3D printing method, the resistive material is selected from the group consisting of carbon black, carbon nanotubes, graphene, poly(3,4-ethylenedioxythiophene) polystyrene sulfonate (PEDOT:PSS), tin-doped indium oxide (ITO) nanoparticles, silicon nanoparticles, and combinations thereof. In one of these examples, the resistive material consists of carbon black. While poly(3,4-ethylenedioxythiophene) polystyrene sulfonate is provided as one example of a semiconductive polymer, it is to be understood that other semiconducting polymers may be used. While ITO nanoparticles are provided as one example, it is to be understood that other metal-doped oxide nanoparticles may also be used.

The resistive material may be present in the resistive agent in an amount that allows the resistive agent to efficiently introduce the resistive material to the resistor. The resistive material may also be present in the resistive agent in an amount that allows the resistive agent to jettable via thermal or piezoelectric printing. In some examples, the resistive material may be present in the resistive agent in an amount ranging from about 1 wt % to about 50 wt %, based on a total weight of the resistive agent. In other examples, the resistive material may be present in the resistive agent in an amount ranging from about 3 wt % to about 45 wt %, or from about 1 wt % to about 10 wt %, based on a total weight of the resistive agent. In still another example, the resistive material may be present in the resistive agent in an amount of about 4.5 wt %, based on a total weight of the resistive agent.

Liquid Vehicles

In some examples, the resistive agent includes a liquid vehicle in addition to the resistive material. In some of these examples, the resistive agent consists of the resistive material and the liquid vehicle. In others of these examples, the resistive agent may include additional components.

As used in reference to the resistive agent, the term "liquid vehicle" may refer to the liquid in which the resistive material is dispersed to form the resistive agent. A wide variety of vehicles, including aqueous and non-aqueous vehicles, may be used in the resistive agent.

In some examples, the liquid vehicle of the resistive agent may include water or a non-aqueous solvent (e.g., ethanol, acetone, n-methyl pyrrolidone, aliphatic hydrocarbons, etc.) alone with no other components. In other examples, the liquid vehicle may include other components, depending, in part, upon the applicator that is to be used to dispense the resistive agent. Examples of other suitable resistive agent components include co-solvent(s), humectant(s), surfactant(s), antimicrobial agent(s), anti-kogation agent(s), chelating agent(s) and/or buffer(s).

In an example, the liquid vehicle of the resistive agent includes a co-solvent, a surfactant, and a balance of water. In another example, the liquid vehicle of the resistive agent consists of a co-solvent, a surfactant, and a balance of water. In still another example, the liquid vehicle of the resistive agent consists of a co-solvent, a surfactant, an additive selected from the group consisting of a humectant, an antimicrobial agent, an anti-kogation agent, a chelating agent, a buffer, and a combination thereof, and a balance of water.

It is to be understood that any of the solvent(s) or co-solvent(s), humectant(s), surfactant(s), antimicrobial agent(s), anti-kogation agent(s), and/or chelating agent(s) described herein for the conductive agent may be used in any examples of the resistive agent in any of the amounts provided, except that the percentages will be with respect to the total weight of the resistive agent.

3D Printing Multi-Fluid Kits and 3D Printing Kits and Compositions

Any example of the conductive agent (e.g., including at least the conductive material) and any example of the resistive agent (e.g., including at least the resistive material) described herein may be part of a multi-fluid kit for three-dimensional (3D) printing, a three-dimensional (3D) printing kit, and/or a three-dimensional (3D) printing composition.

In an example, the multi-fluid kit for three-dimensional (3D) printing, comprises: a conductive agent to be applied to at least a portion of a build material composition during 3D printing, the conductive agent including a conductive material; a resistive agent to be applied to the at least the portion of the build material composition during 3D printing, the resistive agent including a resistive material; and a fusing agent to be applied to at least a region of the build material composition during 3D printing, the fusing agent including an energy absorber.

In some examples, the multi-fluid kit consists of the conductive agent, the resistive agent, and the fusing agent with no other components. In other examples, the multi-fluid kit includes additional components, such as another fusing agent, a detailing agent, or a combination thereof. In one of these examples, the multi-fluid kit further comprises a detailing agent including a surfactant, a co-solvent, and water. In still other examples, the multi-fluid kit consists of the conductive agent, the resistive agent, the fusing agent, and the other fusing agent with no other components. In yet other examples, the multi-fluid kit consists of the conductive agent, the resistive agent, the fusing agent(s), and the detailing agent with no other components.

Any example of the multi-fluid kit may also be part of a 3D printing kit and/or composition. In an example, the three-dimensional (3D) printing kit or composition, comprises: a build material composition including a polymer; a conductive agent to be applied to at least a portion of the build material composition during 3D printing, the conductive agent including a conductive material; a resistive agent to be applied to the at least the portion of the build material composition during 3D printing, the resistive agent including a resistive material; and a fusing agent to be applied to at least a region of the build material composition during 3D printing, the fusing agent including an energy absorber.

In some examples, the 3D printing kit or composition consists of the build material composition, the conductive agent, the resistive agent, and the fusing agent with no other components. In other examples, the 3D printing kit or composition includes additional components, such as another fusing agent, a detailing agent, or a combination thereof. In still other examples, the 3D printing kit or composition consists of the build material composition, the conductive agent, the resistive agent, the fusing agent, and the other fusing agent with no other components. In yet other examples, the 3D printing kit or composition consists of the build material composition, the conductive agent, the resistive agent, the fusing agent(s), and the detailing agent with no other components.

As used herein, "material set" or "kit" may, in some instances, be synonymous with "composition." Further, "material set" and "kit" are understood to be compositions comprising one or more components where the different components in the compositions are each contained in one or more containers, separately or in any combination, prior to and during printing but these components can be combined together during printing. The containers can be any type of a vessel, box, or receptacle made of any material. As such, in any of the examples disclosed herein, the components of the multi-fluid kit and/or 3D printing kit or composition may be maintained separately until used together in examples of the 3D printing method disclosed herein.

Example compositions of the fusing agent and the detailing agent that are suitable for use in examples of the multi-fluid kit and/or in examples of the 3D printing kit or composition are described below. Example compositions of the build material composition that are suitable for use in examples of the 3D printing kit or composition are also described below.

Fusing Agents

As mentioned herein, in some examples of the 3D printing method disclosed herein, a separate fusing agent may be used. As also mentioned above, the fusing agent includes an energy absorber.

Energy Absorbers

In some examples, the energy absorber may have substantial absorption (e.g., 80%) at least in the visible region (400 nm-780 nm) and may have substantial absorption in the infrared region (e.g., 800 nm to 4000 nm). In other examples, the energy absorber may have substantial absorption at wavelengths ranging from 800 nm to 4000 nm and have transparency at wavelengths ranging from 400 nm to 780 nm. As used herein, "substantial absorption" means that at least 80% of radiation having wavelengths within the specified range is absorbed. Also as used herein, "transparency" means that 25% or less of radiation having wavelengths within the specified range is absorbed.

In some examples, the energy absorber may be an infrared light absorbing colorant. In an example, the energy absorber is a near-infrared light absorber. Any near-infrared colorants, e.g., those produced by Fabricolor, Eastman Kodak, or BASF, Yamamoto, may be used in the fusing agent. As one example, the fusing agent may be a printing liquid formulation including carbon black as the energy absorber. Examples of this printing liquid formulation are commercially known as CM997A, 516458, C18928, C93848, C93808, or the like, all of which are available from HP Inc.

As another example, the fusing agent may be a printing liquid formulation including near-infrared absorbing dyes as the energy absorber. Examples of this printing liquid formulation are described in U.S. Pat. No. 9,133,344, incorporated herein by reference in its entirety. Some examples of the near-infrared absorbing dye are water-soluble near-infrared absorbing dyes selected from the group consisting of:

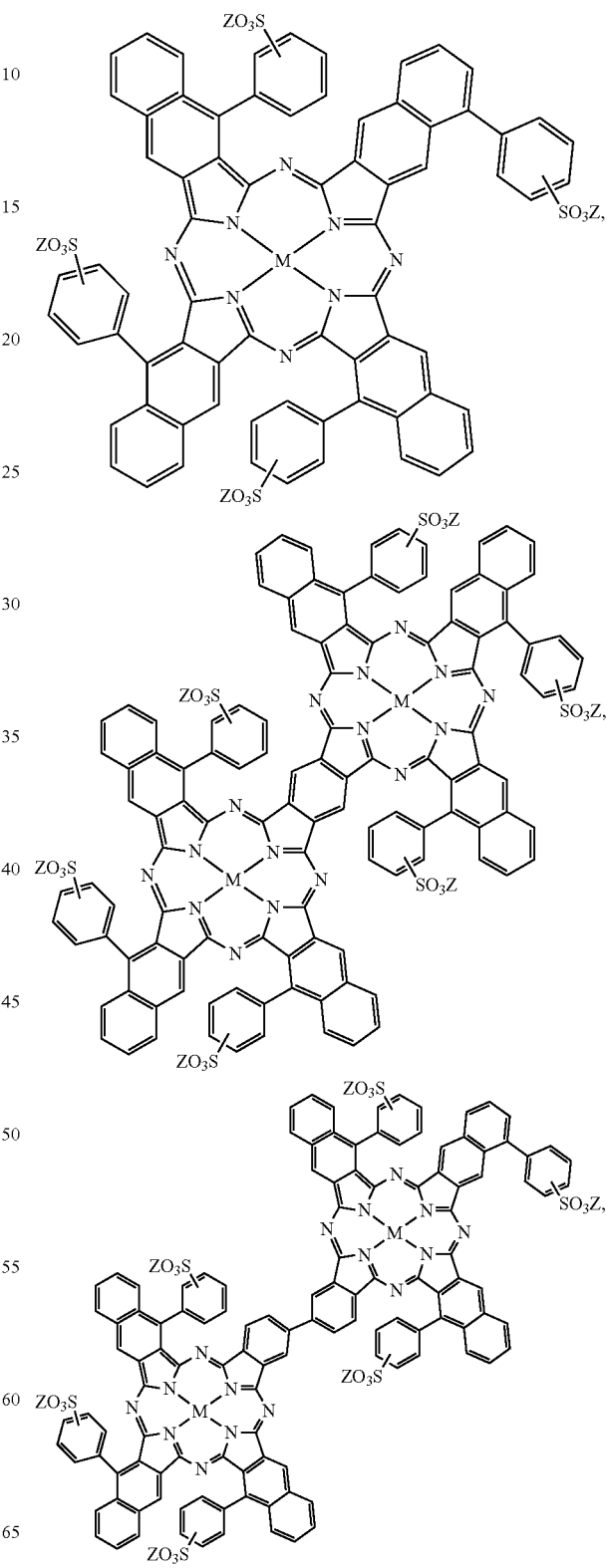

-continued

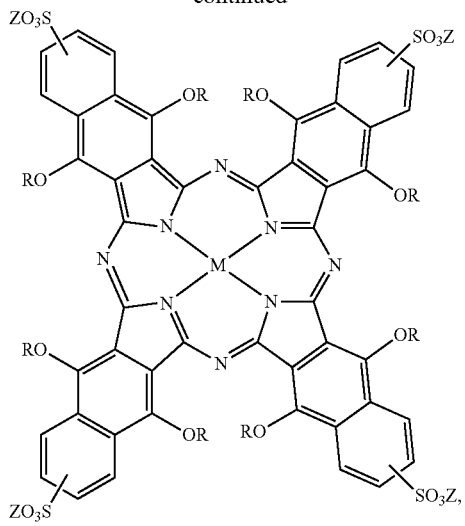

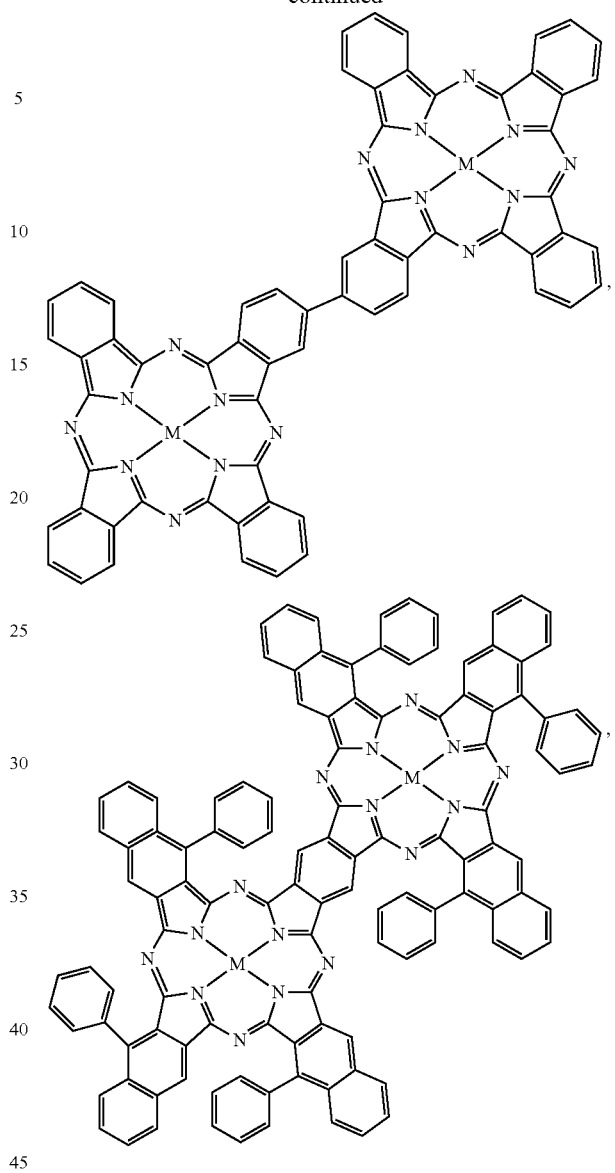

and mixtures thereof. In the above formulations, M can be a divalent metal atom (e.g., copper, etc.) or can have $OSO_3Na$ axial groups filling any unfilled valencies if the metal is more than divalent (e.g., indium, etc.), R can be hydrogen or any $C_1$-$C_8$ alkyl group (including substituted alkyl and unsubstituted alkyl), and Z can be a counterion such that the overall charge of the near-infrared absorbing dye is neutral. For example, the counterion can be sodium, lithium, potassium, $NH_4^+$, etc.

Some other examples of the near-infrared absorbing dye are hydrophobic near-infrared absorbing dyes selected from the group consisting of:

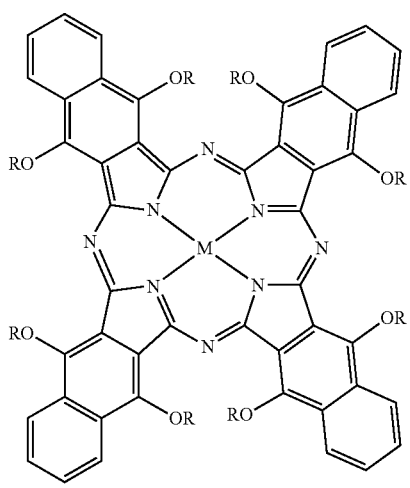

and mixtures thereof. For the hydrophobic near-infrared absorbing dyes, M can be a divalent metal atom (e.g., copper, etc.) or can include a metal that has Cl, Br, or OR' (R'=H, $CH_3$, $COCH_3$, $COCH_2COOCH_3$, $COCH_2COCH_3$) axial groups filling any unfilled valencies if the metal is more than divalent, and R can be hydrogen or any $C_1$-$C_8$ alkyl group (including substituted alkyl and unsubstituted alkyl).

Other near-infrared absorbing dyes or pigments may be used. Some examples include anthroquinone dyes or pigments, metal dithiolene dyes or pigments, cyanine dyes or pigments, perylenediimide dyes or pigments, croconium dyes or pigments, pyrilium or thiopyrilium dyes or pigments, boron-dipyrromethene dyes or pigments, or aza-boron-dipyrromethene dyes or pigments.

Anthroquinone dyes or pigments and metal (e.g., nickel) dithiolene dyes or pigments may have the following structures, respectively:

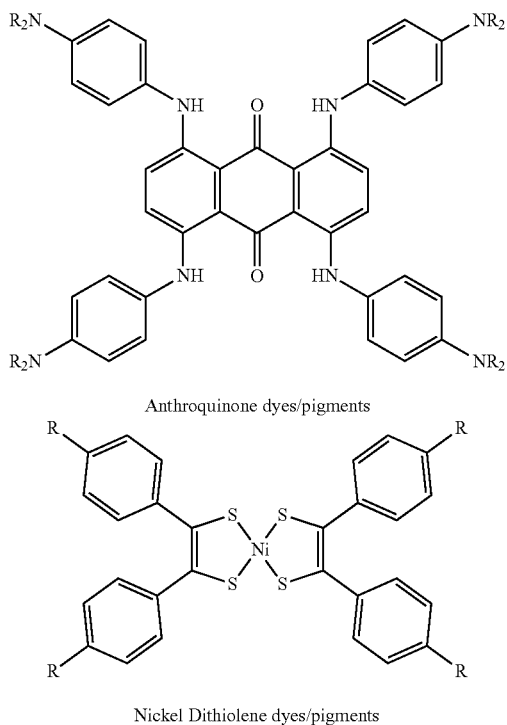

Anthroquinone dyes/pigments

Nickel Dithiolene dyes/pigments where R in the anthroquinone dyes or pigments may be hydrogen or any $C_1$-$C_8$ alkyl group (including substituted alkyl and unsubstituted alkyl), and R in the dithiolene may be hydrogen, COOH, $SO_3$, $NH_2$, any $C_1$-$C_8$ alkyl group (including substituted alkyl and unsubstituted alkyl), or the like.

Cyanine dyes or pigments and perylenediimide dyes or pigments may have the following structures, respectively:

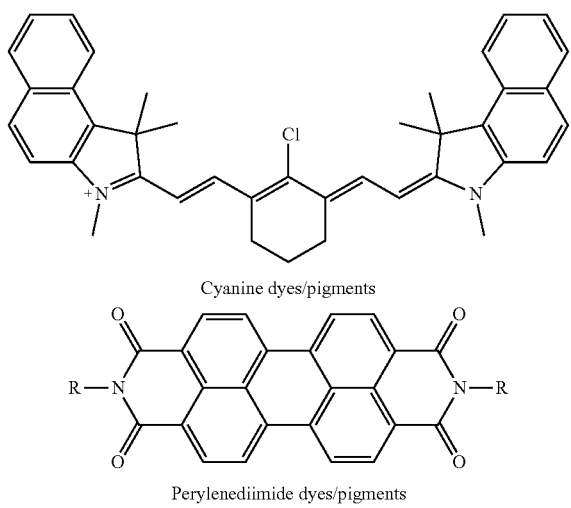

Cyanine dyes/pigments

Perylenediimide dyes/pigments where R in the perylenediimide dyes or pigments may be hydrogen or any $C_1$-$C_8$ alkyl group (including substituted alkyl and unsubstituted alkyl).

Croconium dyes or pigments and pyrilium or thiopyrilium dyes or pigments may have the following structures, respectively:

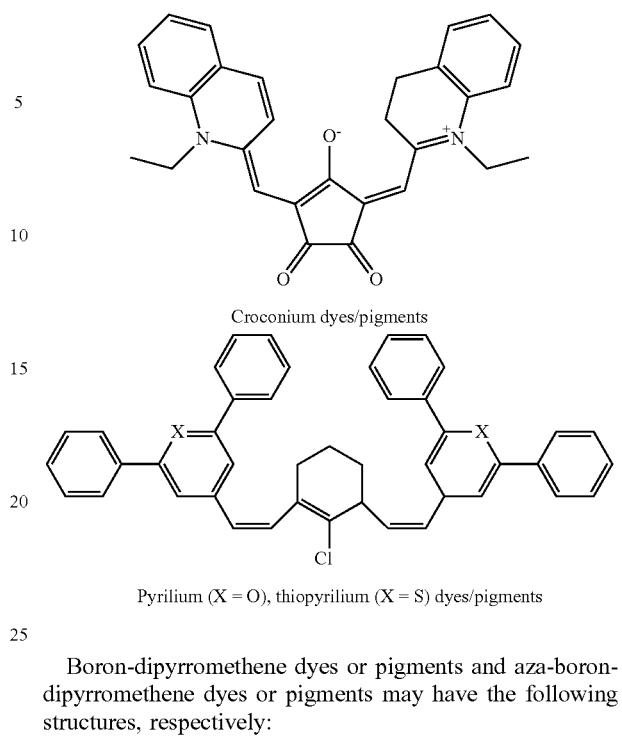

Croconium dyes/pigments

Pyrilium (X = O), thiopyrilium (X = S) dyes/pigments

Boron-dipyrromethene dyes or pigments and aza-boron-dipyrromethene dyes or pigments may have the following structures, respectively:

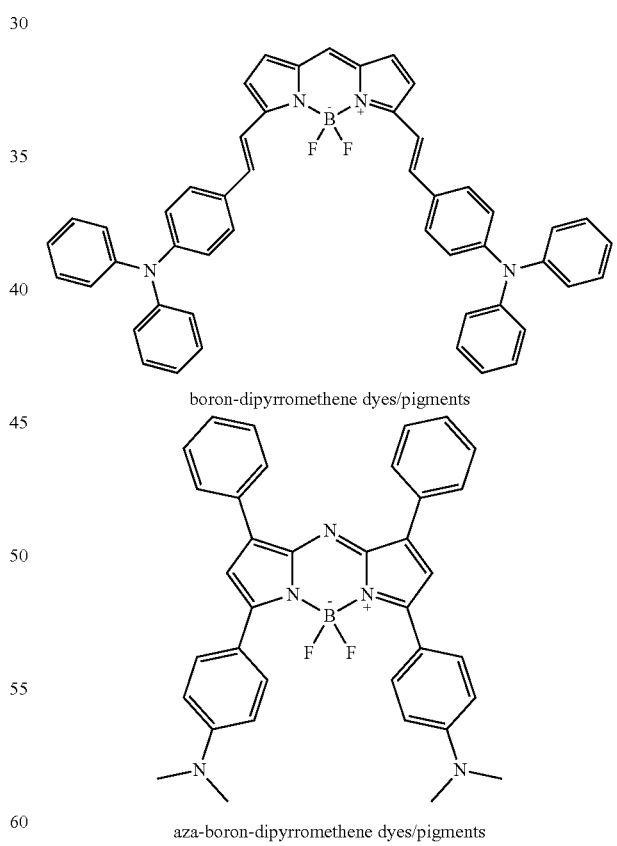

boron-dipyrromethene dyes/pigments aza-boron-dipyrromethene dyes/pigments

In other examples, the energy absorber may be the energy absorber that has absorption at wavelengths ranging from 800 nm to 4000 nm and transparency at wavelengths ranging from 400 nm to 780 nm. The absorption of this energy absorber is the result of plasmonic resonance effects. Electrons associated with the atoms of the energy absorber may be collectively excited by radiation, which results in collective oscillation of the electrons. The wavelengths that can excite and oscillate these electrons collectively are dependent on the number of electrons present in the energy absorber particles, which in turn is dependent on the size of the energy absorber particles. The amount of energy that can collectively oscillate the particle's electrons is low enough that very small particles (e.g., 1-100 nm) may absorb radiation with wavelengths several times (e.g., from 8 to 800 or more times) the size of the particles. The use of these particles allows the fusing agent to be inkjet jettable as well as electromagnetically selective (e.g., having absorption at wavelengths ranging from 800 nm to 4000 nm and transparency at wavelengths ranging from 400 nm to 780 nm).

In an example, this energy absorber has an average particle diameter (e.g., volume-weighted mean diameter) ranging from greater than 0 nm to less than 220 nm. In another example, the energy absorber has an average particle diameter ranging from greater than 0 nm to 120 nm. In a still another example, the energy absorber has an average particle diameter ranging from about 10 nm to about 200 nm.

In an example, this energy absorber is an inorganic pigment. Examples of suitable inorganic pigments include lanthanum hexaboride ($LaB_6$), tungsten bronzes ($A_xWO_3$), indium tin oxide ($In_2O_3:SnO_2$, ITO), antimony tin oxide ($Sb_2O_3:SnO_2$, ATO), titanium nitride (TiN), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), modified copper phosphates ($A_xCu_yPO_z$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

The amount of the energy absorber that is present in the fusing agent ranges from greater than 0 wt % active to about 40 wt % active based on the total weight of the fusing agent. In other examples, the amount of the energy absorber in the fusing agent ranges from about 0.3 wt % active to 30 wt % active, from about 1 wt % active to about 20 wt % active, from about 1.0 wt % active up to about 10.0 wt % active, or from greater than 4.0 wt % active up to about 15.0 wt % active. It is believed that these energy absorber loadings provide a balance between the fusing agent having jetting reliability and heat and/or radiation absorbance efficiency.

FA Vehicles

The fusing agent may also include an FA vehicle in which the energy absorber is dispersed or dissolved to form the fusing agent. A wide variety of FA vehicles, including aqueous and non-aqueous vehicles, may be used in the fusing agent.

The solvent of the fusing agent may be water or a non-aqueous solvent (e.g., ethanol, acetone, n-methyl pyrrolidone, aliphatic hydrocarbons, etc.). In some examples, the fusing agent consists of the energy absorber and the solvent (without other components). In these examples, the solvent makes up the balance of the fusing agent. In other examples, the FA vehicle may include other components, depending, in part, upon the applicator that is to be used to dispense the fusing agent. Examples of other suitable fusing agent components include dispersant(s), silane coupling agent(s), co-solvent(s), humectant(s), surfactant(s), antimicrobial agent(s), anti-kogation agent(s), and/or chelating agent(s).

In some examples, the FA vehicle of the fusing agent may be similar to the aqueous vehicle of the conductive agent. As such, the FA vehicle of the fusing agent may include any of the components described above in reference to the conductive agent in any of the amount described above (with the amount(s) being based on the total weight of the fusing agent rather than the total weight of the conductive agent).

When energy absorber is an inorganic pigment (having absorption at wavelengths ranging from 800 nm to 4000 nm and transparency at wavelengths ranging from 400 nm to 780 nm), the FA vehicle may also include dispersant(s) and/or silane coupling agent(s).

The energy absorber (i.e., the inorganic pigment having absorption at wavelengths ranging from 800 nm to 4000 nm and transparency at wavelengths ranging from 400 nm to 780 nm) may, in some instances, be dispersed with a dispersant. As such, the dispersant helps to uniformly distribute the energy absorber throughout the fusing agent. Examples of suitable dispersants include polymer or small molecule dispersants, charged groups attached to the energy absorber surface, or other suitable dispersants. Some specific examples of suitable dispersants include a water-soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins.

Whether a single dispersant is used or a combination of dispersants is used, the total amount of dispersant(s) in the fusing agent may range from about 10 wt % to about 200 wt % based on the weight of the energy absorber in the fusing agent.

A silane coupling agent may also be added to the fusing agent to help bond the organic and inorganic materials. Examples of suitable silane coupling agents include the SILQUEST® A series manufactured by Momentive.

Whether a single silane coupling agent is used or a combination of silane coupling agents is used, the total amount of silane coupling agent(s) in the fusing agent may range from about 0.1 wt % active to about 50 wt % active based on the weight of the energy absorber in the fusing agent. In an example, the total amount of silane coupling agent(s) in the fusing agent ranges from about 1 wt % active to about 30 wt % active based on the weight of the energy absorber. In another example, the total amount of silane coupling agent(s) in the fusing agent ranges from about 2.5 wt % active to about 25 wt % active based on the weight of the energy absorber.

Detailing Agents

In some examples of the method disclosed herein, a detailing agent may be used. The detailing agent may include a surfactant, a co-solvent, and a balance of water. In some examples, the detailing agent consists of these components, and no other components. In some other examples, the detailing agent may further include a colorant. In still some other examples, detailing agent consists of a colorant, a surfactant, a co-solvent, and a balance of water, with no other components. In yet some other examples, the detailing agent may further include additional components, such as anti-kogation agent(s), antimicrobial agent(s), and/or chelating agent(s) (each of which is described above in reference to the conductive agent).

The surfactant(s) that may be used in the detailing agent include any of the surfactants listed above in reference to the conductive agent. The total amount of surfactant(s) in the detailing agent may range from about 0.10 wt % to about 5.00 wt % with respect to the total weight of the detailing agent.

The co-solvent(s) that may be used in the detailing agent include any of the co-solvents listed above in reference to the conductive agent. The total amount of co-solvent(s) in the detailing agent may range from about 1.00 wt % to about 20.00 wt % with respect to the total weight of the detailing agent.

In some examples, the detailing agent does not include a colorant. In these examples, the detailing agent may be colorless. As used herein, "colorless," means that the detailing agent is achromatic and does not include a colorant.

When the detailing agent includes the colorant, the colorant may be a dye of any color having substantially no absorbance in a range of 650 nm to 2500 nm. By "substantially no absorbance" it is meant that the dye absorbs no radiation having wavelengths in a range of 650 nm to 2500 nm, or that the dye absorbs less than 10% of radiation having wavelengths in a range of 650 nm to 2500 nm. The dye is also capable of absorbing radiation with wavelengths of 650 nm or less. As such, the dye absorbs at least some wavelengths within the visible spectrum, but absorbs little or no wavelengths within the near-infrared spectrum. This is in contrast to the active material in the fusing agent, which absorbs wavelengths within the near-infrared spectrum. As such, the colorant in the detailing agent will not substantially absorb the fusing radiation, and thus will not initiate melting and fusing of the build material composition in contact therewith when the build material layer is exposed to the fusing radiation.

The dye in the detailing agent may be selected so that its color matches the color of the active material in the fusing agent. As examples, the dye may be any azo dye having sodium or potassium counter ion(s) or any diazo (i.e., double azo) dye having sodium or potassium counter ion(s), where the color of azo or dye azo dye matches the color of the fusing agent.

In an example, the dye is a black dye. Some examples of the black dye include azo dyes having sodium or potassium counter ion(s) and diazo (i.e., double azo) dyes having sodium or potassium counter ion(s). Examples of azo and diazo dyes may include tetrasodium (6Z)-4-acetamido-5-oxo-6-[[7-sulfonato-4-(4-sulfonatophenyl)azo-1-naphthyl]hydrazono]naphthalene-1,7-disulfonate with a chemical structure of:

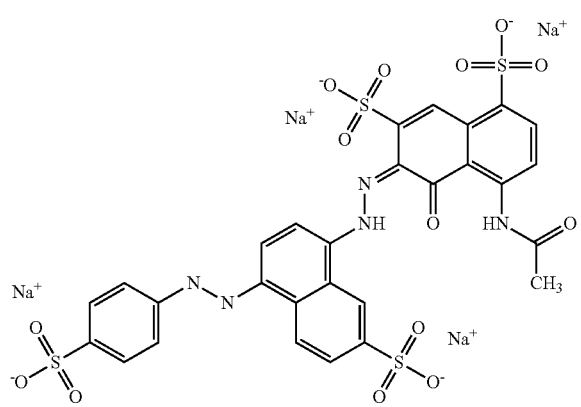

(commercially available as Food Black 1); tetrasodium 6-amino-4-hydroxy-3-[[7-sulfonato-4-[(4-sulfonatophenyl)azo]-1-naphthyl]azo]naphthalene-2,7-disulfonate with a chemical structure of:

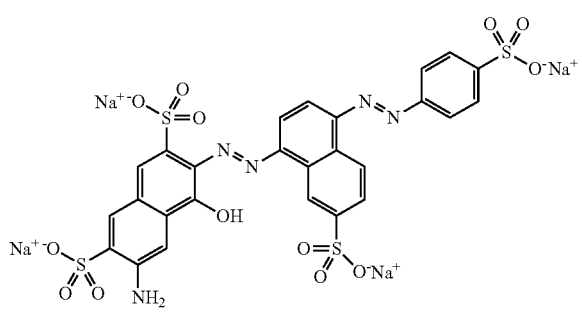

(commercially available as Food Black 2); tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

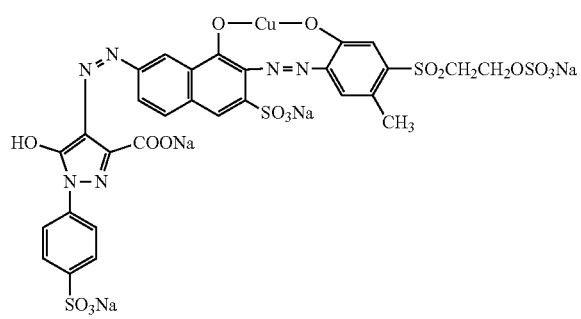

(commercially available as Reactive Black 31); tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

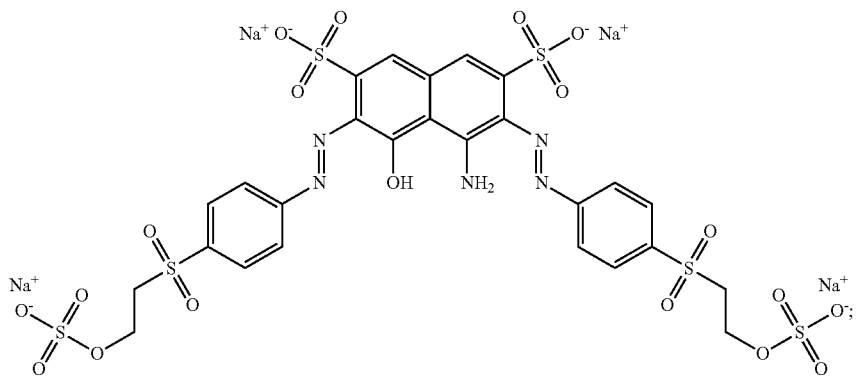

and combinations thereof. Some other commercially available examples of the dye used in the detailing agent include multipurpose black azo-dye based liquids, such as PRO-JET® Fast Black 1 (made available by Fujifilm Holdings), and black azo-dye based liquids with enhanced water fastness, such as PRO-JET® Fast Black 2 (made available by Fujifilm Holdings).

In some instances, in addition to the black dye, the colorant in the detailing agent may further include another dye. In an example, the other dye may be a cyan dye that is used in combination with any of the dyes disclosed herein. The other dye may also have substantially no absorbance above 650 nm. The other dye may be any colored dye that contributes to improving the hue and color uniformity of the final 3D part.

Some examples of the other dye include a salt, such as a sodium salt, an ammonium salt, or a potassium salt. Some specific examples include ethyl-[4-[[4-[ethyl-[(3-sulfophenyl) methyl] amino] phenyl]-(2-sulfophenyl) ethylidene]-1-cyclohexa-2,5-dienylidene]-[(3-sulfophenyl) methyl] azanium with a chemical structure of:

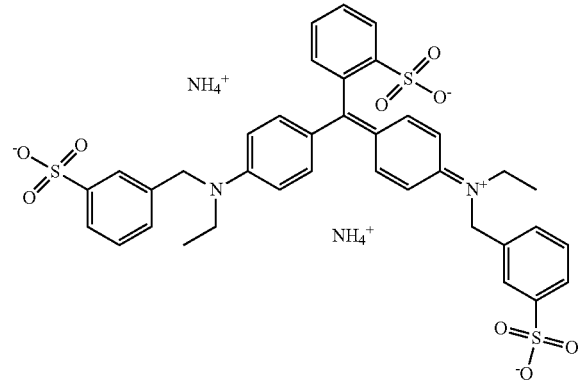

(commercially available as Acid Blue 9, where the counter ion may alternatively be sodium counter ions or potassium counter ions); sodium 4-[(E)-{4-[benzyl(ethyl)amino]phenyl}{(4E)-4-[benzyl(ethyl)iminio]cyclohexa-2,5-dien-1-ylidene}methyl]benzene-1,3-disulfonate with a chemical structure of:

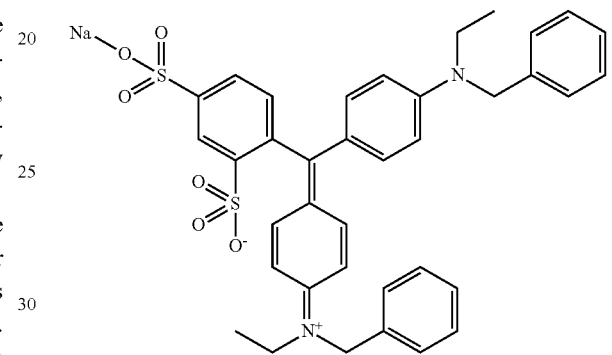

(commercially available as Acid Blue 7); and a phthalocyanine with a chemical structure of:

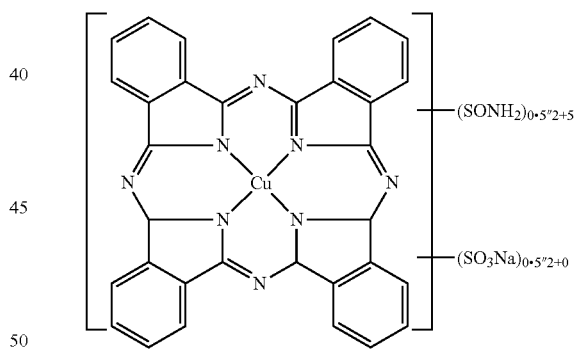

(commercially available as Direct Blue 199); and combinations thereof.

In an example of the detailing agent, the dye may be present in an amount ranging from about 1.00 wt % to about 3.00 wt % based on the total weight of the detailing agent. In another example of the detailing agent including a combination of dyes, one dye (e.g., the black dye) is present in an amount ranging from about 1.50 wt % to about 1.75 wt % based on the total weight of the detailing agent, and the other dye (e.g., the cyan dye) is present in an amount ranging from about 0.25 wt % to about 0.50 wt % based on the total weight of the detailing agent.

The balance of the detailing agent is water. As such, the amount of water may vary depending upon the amounts of the other components that are included.

Build Material Composition

In the examples of the 3D printing method disclosed herein, a build material composition may be used. The build material composition includes a polymer.

In some examples, the build material composition consists of the polymer. In other examples, the build material composition may include additional components, such as an antioxidant, a whitener, an antistatic agent, a flow aid, or a combination thereof.

In some examples, the polymer may be a crystalline or semi-crystalline polymer. Some examples of semi-crystalline polymers include polyamides (PAs), such as polyamide 11 (PA 11/nylon 11), polyamide 12 (PA 12/nylon 12), polyamide 6 (PA 6/nylon 6), polyamide 4,6 (PA 4,6/nylon 4,6), polyamide 13 (PA 13/nylon 13), polyamide 6,13 (PA 6,13/nylon 6,13), polyamide 8 (PA 8/nylon 8), polyamide 9 (PA 9/nylon 9), polyamide 66 (PA 66/nylon 66), polyamide 612 (PA 612/nylon 612), polyamide 812 (PA 812/nylon 812), polyamide (PA 912/nylon 912), etc. Other examples of crystalline or semi-crystalline polymers suitable for use as the polymer include polyethylene, polypropylene, and polyoxomethylene (i.e., polyacetals). Still other examples of suitable polymers include polystyrene, polycarbonate, polyester, polyurethanes, other engineering plastics, and blends of any two or more of the polymers listed herein. One example of a suitable polyester is polybutylene terephthalate (PBT).

In some examples, the polymer may be a thermoplastic elastomer. Some examples of thermoplastic elastomers include a thermoplastic polyamide (TPA), a thermoplastic polyurethane (TPU), a styrenic block copolymer (TPS), a thermoplastic polyolefin elastomer (TPO), a thermoplastic vulcanizate (TPV), and a thermoplastic copolyester (TPC). In an example, the thermoplastic elastomer is a thermoplastic polyamide. Thermoplastic polyamide elastomers are thermoplastic elastomer block copolymers based on nylon and polyethers or polyesters. Examples of TPA elastomers include polyether block amide elastomers. Polyether block amide elastomers may be obtained by the polycondensation of a carboxylic acid terminated polyamide (PA 6, PA 11, PA 12) with an alcohol terminated polyether (e.g., polytetramethylene glycol (PTMG), polyethylene glycol (PEG), etc.). Two examples of commercially available PEBA elastomers include those known under the tradename of PEBAX® (Arkema) and VESTAMID® E (Evonik Degussa). In another example, the thermoplastic elastomer is a thermoplastic polyurethane. Thermoplastic polyurethane elastomers may be obtained by reaction of: (i) diisocyanates with short-chain diols (so-called chain extenders) and/or (ii) diisocyanates with long-chain diols. Two examples of commercially available TPU elastomers include those known under the tradename of DESMOPAN® (Covestro) and ELASTOLLAN® (BASF Corp.).

In some examples, the polymer may be in the form of a powder. In other examples, the polymer may be in the form of a powder-like material, which includes, for example, short fibers having a length that is greater than its width. In some examples, the powder or powder-like material may be formed from, or may include, short fibers that may, for example, have been cut into short lengths from long strands or threads of material.

The polymer may be made up of similarly sized particles and/or differently sized particles. In an example, the particle size of the polymer ranges from about 2 μm to about 200 μm. In another example, the particle size of the polymer ranges from about 10 μm to about 110 μm. As mentioned above, the term "particle size", as used herein, may refer to a number-weighted mean diameter or a volume-weighted mean diameter of a particle distribution.

When the polymer is a crystalline or semi-crystalline polymer, the polymer may have a wide processing window of greater than 5° C., which can be defined by the temperature range between the melting point and the re-crystallization temperature. In an example, the polymer may have a melting point ranging from about 50° C. to about 300° C. As other examples, the polymer may have a melting point ranging from about 155° C. to about 225° C., from about 155° C. to about 215° C., about 160° C. to about 200° C., from about 170° C. to about 190° C., or from about 182° C. to about 189° C. As still another example, the polymer may be a polyamide having a melting point of about 180° C.

When the polymer is a thermoplastic elastomer, the thermoplastic elastomer may have a melting range within the range of from about 130° C. to about 250° C. In some examples (e.g., when the thermoplastic elastomer is a polyether block amide), the thermoplastic elastomer may have a melting range of from about 130° C. to about 175° C. In some other examples (e.g., when the thermoplastic elastomer is a thermoplastic polyurethane), the thermoplastic elastomer may have a melting range of from about 130° C. to about 180° C. or a melting range of from about 175° C. to about 210° C.

In some examples, the polymer does not substantially absorb radiation having a wavelength within the range of 300 nm to 1400 nm. In other examples, the polymer does not substantially absorb radiation having a wavelength within the range of 800 nm to 1400 nm. In still other examples, the polymer does not substantially absorb radiation having a wavelength within the range of 400 nm to 1200 nm. In these examples, the polymer may be considered to reflect the wavelengths at which the polymer does not substantially absorb radiation. The phrase "does not substantially absorb" means that the absorptivity of the polymer at a particular wavelength is 25% or less (e.g., 20%, 10%, 5%, etc.).

Antioxidant(s) may be added to the build material composition to prevent or slow molecular weight decreases of the polymer and/or may prevent or slow discoloration (e.g., yellowing) of the polymer by preventing or slowing oxidation of the polymer. In some examples, the antioxidant may discolor upon reacting with oxygen, and this discoloration may contribute to the discoloration of the build material composition. The antioxidant may be selected to minimize discoloration. In some examples, the antioxidant may be a radical scavenger. In these examples, the antioxidant may include IRGANOX® 1098 (benzenepropanamide, N,N'-1, 6-hexanediylbis(3,5-bis(1,1-dimethylethyl)-4-hydroxy)), IRGANOX® 254 (a mixture of 40% triethylene glycol bis(3-tert-butyl-4-hydroxy-5-methylphenyl), polyvinyl alcohol and deionized water), and/or other sterically hindered phenols. In other examples, the antioxidant may include a phosphite and/or an organic sulfide (e.g., a thioester). The antioxidant may be in the form of fine particles (e.g., having an average particle size of 5 μm or less) that are dry blended with the polymer. In an example, the antioxidant may be included in the build material composition in an amount ranging from about 0.01 wt % to about 5 wt %, based on the total weight of the build material composition. In other examples, the antioxidant may be included in the build material composition in an amount ranging from about 0.01 wt % to about 2 wt % or from about 0.2 wt % to about 1 wt %, based on the total weight of the build material composition.

Whitener(s) may be added to the build material composition to improve visibility. Examples of suitable whiteners include titanium dioxide ($TiO_2$), zinc oxide (ZnO), calcium carbonate ($CaCO_3$), zirconium dioxide ($ZrO_2$), aluminum oxide ($Al_2O_3$), silicon dioxide ($SiO_2$), boron nitride (BN), and combinations thereof. In some examples, a stilbene derivative may be used as the whitener and a brightener. In these examples, the temperature(s) of the 3D printing process may be selected so that the stilbene derivative remains stable (i.e., the 3D printing temperature does not thermally decompose the stilbene derivative). In an example, any example of the whitener may be included in the build material composition in an amount ranging from greater than 0 wt % to about 10 wt %, based on the total weight of the build material composition.

Antistatic agent(s) may be added to the build material composition to suppress tribo-charging. Examples of suitable antistatic agents include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available antistatic agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the antistatic agent is added in an amount ranging from greater than 0 wt % to less than 5 wt %, based upon the total weight of the build material composition.

Flow aid(s) may be added to improve the coating flowability of the build material composition. Flow aids may be particularly beneficial when the build material composition has an average particle size less than 25 µm. The flow aid improves the flowability of the build material composition by reducing the friction, the lateral drag, and the tribocharge buildup (by increasing the particle conductivity). Examples of suitable flow aids include aluminum oxide ($Al_2O_3$), tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), and polydimethylsiloxane (E900). In an example, the flow aid is added in an amount ranging from greater than 0 wt % to less than 5 wt %, based upon the total weight of the build material composition.

Printing Methods

Figure 2:
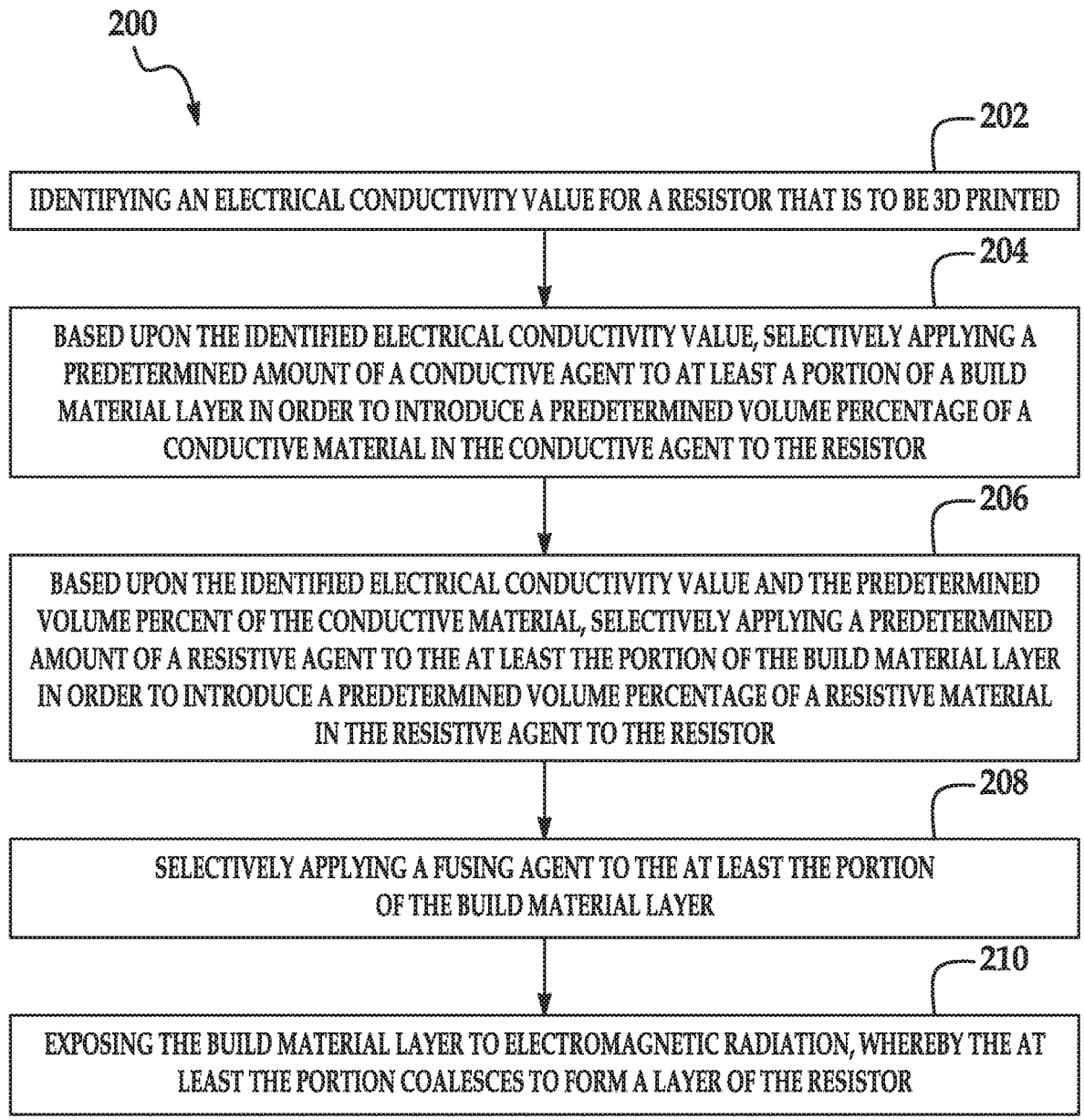
FIG. 2 is a flow diagram illustrating another example of the 3D printing method.
Figure 3:
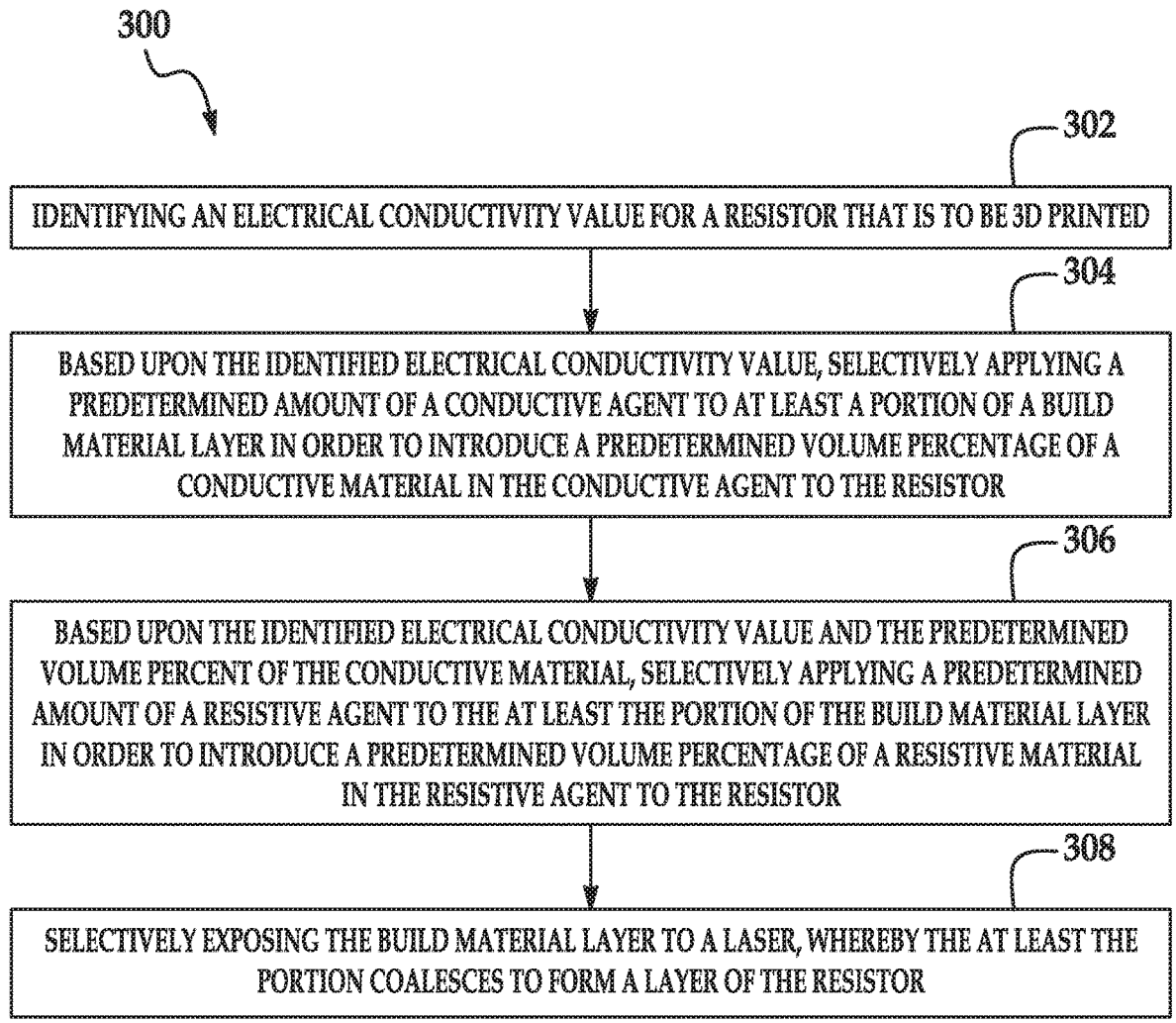
FIG. 3 is a flow diagram illustrating still another example of the 3D printing method.

Referring now to FIGS. 1 through 3, example of printing methods 100, 200, 300 are depicted. The examples of the methods 100, 200, 300 may use an example of the conductive agent and an example of the resistive agent to impart a desired electrical conductivity value to a resistor formed as the 3D printed object or as part of a 3D printed object.

As shown in FIG. 1, the three-dimensional (3D) printing method 100 comprises: identifying an electrical conductivity value for a resistor that is to be 3D printed (reference numeral 102); based upon the identified electrical conductivity value, selectively applying a predetermined amount of a conductive agent to at least a portion of a build material layer in order to introduce a predetermined volume percentage of a conductive material in the conductive agent to the resistor (reference numeral 104); based upon the identified electrical conductivity value and the predetermined volume percent of the conductive material, selectively applying a predetermined amount of a resistive agent to the at least a portion of the build material layer in order to introduce a predetermined volume percentage of a resistive material in the resistive agent to the resistor (reference numeral 106); and exposing the build material layer to electromagnetic radiation, whereby the at least the portion coalesces to form a layer of the resistor (reference numeral 108). Examples of the method 100 will be further described below in the section labeled "Printing with Conductive Agents and Resistive Agents" and in reference to FIG. 4.

As shown in FIG. 2, the three-dimensional (3D) printing method 200 comprises: identifying an electrical conductivity value for a resistor that is to be 3D printed (reference numeral 202); based upon the identified electrical conductivity value, selectively applying a predetermined amount of a conductive agent to at least a portion of a build material layer in order to introduce a predetermined volume percentage of a conductive material in the conductive agent to the resistor (reference numeral 204); based upon the identified electrical conductivity value and the predetermined volume percent of the conductive material, selectively applying a predetermined amount of a resistive agent to the at least a portion of the build material layer in order to introduce a predetermined volume percentage of a resistive material in the resistive agent to the resistor (reference numeral 206); selectively applying a fusing agent to the at least a portion of the build material layer (reference numeral 208); and exposing the build material layer to electromagnetic radiation, whereby the at least the portion coalesces to form a layer of the resistor (reference numeral 210). Examples of the method 200 will be further described below in the section labeled "Printing with Conductive Agents, Resistive Agents, and Fusing Agents" and in reference to FIG. 5.

As shown in FIG. 3, the three-dimensional (3D) printing method 300 comprises: identifying an electrical conductivity value for a resistor that is to be 3D printed (reference numeral 302); based upon the identified electrical conductivity value, selectively applying a predetermined amount of a conductive agent to at least a portion of a build material layer in order to introduce a predetermined volume percentage of a conductive material in the conductive agent to the resistor (reference numeral 304); based upon the identified electrical conductivity value and the predetermined volume percent of the conductive material, selectively applying a predetermined amount of a resistive agent to the at least a portion of the build material layer in order to introduce a predetermined volume percentage of a resistive material in the resistive agent to the resistor (reference numeral 306); and selectively exposing the build material layer to a laser, whereby the at least the portion coalesces to form a layer of the resistor (reference numeral 308). Examples of the method 300 will be further described below in the section labeled "Printing with Conductive Agents and Resistive Agents using SLS" and in reference to FIG. 6.

Furthermore, prior to execution of any examples of the methods 100, 200, 300, it is to be understood that a controller may access data stored in a data store pertaining to a 3D part/object that is to be printed. For example, the controller may determine the number layers of the build material composition that are to be formed, the locations at which any of the agents is/are to be deposited on each of the respective layers, etc.

As mentioned above, examples of the methods 100, 200, 300 disclosed herein include identifying an electrical conductivity value for a resistor that is to be 3D printed. This value represents a desirable conductivity that is to be imparted to the resistor that is being 3D printed. The electrical conductivity value that is identified will depend upon the desirable function of the resistor being printed. For example, if it is desirable for the 3D printed resistor to strongly resist the flow of current, the identified electrical conductivity value may be lower than if it is desirable for the 3D printed resistor to weakly resist the flow of current. Since conductivity is the reciprocal for resistivity, one could also identify a desirable resistivity value and then convert it to a desirable conductivity value.

The desired electrical conductivity value can be imparted to the 3D printed resistor by controlling the volume percentage of the conductive material and the volume percentage of the resistive material in the resistor. It has unexpectedly been discovered that the relationship between the resistor conductivity and the volume ratio of the two materials in the resistor is non-linear. As such, the amount of the conductive agent that is applied is based upon the loading of the conductive material in the conductive agent, the desirable electrical conductivity value for the resistor being formed, and the volume percentage of the resistive material that is to be introduced to the resistor. Similarly, the amount of the resistive agent that is applied is based upon the loading of the resistive material in the resistive agent, the desirable electrical conductivity value for the resistor being formed, and the volume percentage of the conductive material that is to be introduced to the resistor.

In some examples of the method 100, 200, 300, based on the identified electrical conductivity value, a predetermined amount of a conductive agent is selectively applied to at least a portion of a build material layer in order to introduce a predetermined volume percentage of a conductive material in the conductive agent to the resistor. Then, based upon the identified electrical conductivity value and the predetermined volume percent of the conductive material, a predetermined amount of a resistive agent is selectively applied to the at least a portion of the build material layer in order to introduce a predetermined volume percentage of a resistive material in the resistive agent to the resistor. The resistor may include a plurality of layers. In these example, it is to be understood that the selective application of the conductive agent, the selective application of the resistive agent, and the exposure to the electromagnetic radiation is repeated for each of a plurality of build material layers; the predetermined amount of the conductive agent selectively applied to each of the plurality of the build material layers is a fraction of a total amount that will introduce the predetermined volume percentage of the conductive material to the resistor; and the predetermined amount of the resistive agent selectively applied to each of the plurality of the build material layers is a fraction of a total amount that will introduce the predetermined volume percentage of the resistive material to the resistor. In other words, the total amount needed to introduce the predetermined volume percentages to the resistor can be divided among the number of build materials patterned to form the resistor. As such, the predetermined amount can be a fraction of the total amount.

When the resistor is formed, the resistor includes the predetermined volume percent of the conductive material and the predetermined volume percent of the resistive material, which imparts the identified electrical conductivity value±15%. It is to be understood that the amount of variance from the identified electrical conductivity may depend, in part, on the length of the resistor and/or the print conditions (e.g., the amount of thermal energy). For example, a lower amount of thermal energy may result in less coalescence/fusing of the build material composition, which may results in a less dense and therefore, less conductive resistor. The amount of variance may also depend upon the identified electrical conductivity value and the desired conductance. If the conductivity value is lower than the desired conductance, then a longer resistor may be needed. Longer resistors may be less sensitive to process variations that may alter the resulting conductance/resistance of the resistor, which may result in less variance from the identified electrical conductivity. In contrast, shorter resistors may result in larger deviations from the identified electrical conductivity.

In some examples, the predetermined volume percent of the conductive material ranges from about 0.05 vol % to about 10 vol %, the predetermined volume percent of the resistive material ranges from about 0.05 vol % to about 10 vol %, and the electrical conductivity value is within a range 1.E-04 S/m to 1.E+05 S/m. In other examples, the predetermined volume percent of the conductive material ranges from about 0.15 vol % to about 4 vol %, the predetermined volume percent of the resistive material ranges from about 0.15 vol % to about 4 vol %, and the electrical conductivity value is within a range 1.E-04 S/m to 1.E+05 S/m.

It has been unexpectedly discovered that when high amounts (e.g., greater than 2 vol % or more) of the conductive material are introduced to the 3D object being formed, the introduction any amount of the resistive material results in almost no change in conductivity/resistivity. As such, if it is desirable to form a highly conductive trace (e.g., with a conductivity of 1.E+03 S/m or more), a high volume percentage of the conductive material may be introduced with any volume percentage of the resistive material or with none of the resistive material. When forming a highly conductive trace, it may be desirable to add a resistive material that also functions as an energy absorber. In these instances, the resistive material may act as a process control agent and raise the temperature of the patterned portion of the build material, which can speed up the printing of the highly conductive trace.

To achieve a high resistivity (or low conductivity), it has been unexpectedly found that varying amounts of the resistive material and a moderate amount (e.g., from about 1 vol % to about 2 vol %) of the conductive material should be introduced to the resistor. If too little of either the conductive material or the resistive material (e.g., less than 0.05 vol %) is introduced, a conductive pathway may not be formed and an open circuit may be measured. Because most resistive materials have some conductivity, it is to be understood that as more of the resistive material is introduced, the resistivity will ultimately decrease and approach the resistivity of the bulk resistive material (e.g., carbon). This indicates that a resistor can be reliably printed to a resistivity around that of the build resistive material. If a resistor with a higher resistivity is desirable, then another, more resistive, material may be used.

In some examples, the orientation of the resistor pattern during 3D printing may also affect the conductivity/resistivity of the resistor. For example, when the length of a resistor is printed in the z direction (i.e., with respect to an x-y plane of a build platform), the resistor may have a slightly lower conductivity (i.e., slightly higher resistivity) than a second resistor printed with its length in either the y direction or the z-direction. This lower conductivity may be due, in part, to less contact among the conductive material when the resistor is printed in the z direction. In the z-direction, the conductive material has to percolate through the entire thickness of the build material in order to contact the conductive material in the underlying layer, and unsuitable percolation can lead to reduced contact.

Geometry changes to the printed resistor may also help to increase or decrease the resistivity of the resistor. For example, increasing the length of the resistor and/or reducing the cross-sectional area (i.e., width and height) of the resistor may increase the resistivity (i.e., reduce the conductivity) of the resistor.

The following examples demonstrate an electrical conductivity range, and the predetermined volume percentages of the conductive material and of the resistive material that may be incorporated into the resistor so that the resistor exhibits an electrical conductivity value within the range. In these examples, carbon black may be the resistive material and silver nanoparticles may be the conductive agent. It is believed that the examples electrical conductivity ranges and their associated predetermined volume percentages may be applicable for other combinations of resistive and conductive materials having, respectively, a similar resistivity to carbon black and a similar conductivity to silver nanoparticles.

In some examples, the electrical conductivity value is within a range of from 1.E+03 S/m to 1.E+05 S/m; the predetermined volume percent of the conductive material ranges from greater than 2 vol % to about 10 vol %, based on a total volume of the resistor; and the predetermined volume percent of the resistive material ranges from 0.05 vol % to about 10 vol %, based on the total volume of the resistor.

In other examples, the electrical conductivity value is within a range of from 1.E-04 S/m to 1.E-03 S/m; the predetermined volume percent of the conductive material ranges from about 0.05 vol % to less than 1 vol %, based on a total volume of the resistor; and the predetermined volume percent of the resistive material ranges from 0.05 vol % to less than 0.37 vol %, based on the total volume of the resistor.

In still other examples, the electrical conductivity value is within a range of from 1.E-03 S/m to 1.E-01 S/m; the predetermined volume percent of the conductive material ranges from about 0.05 vol % to less than 1 vol %, based on a total volume of the resistor; and the predetermined volume percent of the resistive material ranges from about 0.37 vol % to about 3 vol %, based on the total volume of the resistor.

In yet other examples, the electrical conductivity value is within a range of from 1.E-02 S/m to 1.E+03 S/m; the predetermined volume percent of the conductive material ranges from about 1 vol % to about 2 vol %, based on a total volume of the resistor; and the predetermined volume percent of the resistive material ranges from about 0.19 vol % to about 3 vol %, based on the total volume of the resistor.

In still other examples, the electrical conductivity value is within a range of from 1 S/m to 1.E-04 S/m; and one of: the predetermined volume percent of the conductive material ranges from about 0.5 vol % to about 1.25 vol %, based on a total volume of the resistor, and the predetermined volume percent of the resistive material ranges from 0.7 vol % to about 1.75 vol %, based on the total volume of the resistor; or the predetermined volume percent of the conductive material ranges from about 0.5 vol % to about 1.5 vol %, based on a total volume of the resistor, and the predetermined volume percent of the resistive material ranges from 1.5 vol % to about 1.75 vol %, based on the total volume of the resistor; or the predetermined volume percent of the conductive material ranges from about 0.5 vol % to about 2.0 vol %, based on a total volume of the resistor, and the predetermined volume percent of the resistive material ranges from 1.70 vol % to about 1.75 vol %, based on the total volume of the resistor.

In one of these examples, the electrical conductivity value is within a range of from 1 S/m to 1.E-04 S/m; the predetermined volume percent of the conductive material ranges from about 0.5 vol % to about 1.25 vol %, based on a total volume of the resistor; and the predetermined volume percent of the resistive material ranges from 0.7 vol % to about 1.75 vol %, based on the total volume of the resistor.

In another of these examples, the electrical conductivity value is within a range of from 1 S/m to 1.E-04 S/m; the predetermined volume percent of the conductive material ranges from about 0.5 vol % to about 1.5 vol %, based on a total volume of the resistor; and the predetermined volume percent of the resistive material ranges from 1.5 vol % to about 1.75 vol %, based on the total volume of the resistor.

In yet another of these examples, the electrical conductivity value is within a range of from 1 S/m to 1.E-04 S/m; the predetermined volume percent of the conductive material ranges from about 0.5 vol % to about 2.0 vol %, based on a total volume of the resistor; and the predetermined volume percent of the resistive material ranges from 1.70 vol % to about 1.75 vol %, based on the total volume of the resistor.

In yet other examples, the electrical conductivity value is within a range of from 1 S/m to 1.E-03 S/m; and one of: the predetermined volume percent of the conductive material ranges from about 0.1 vol % to about 0.9 vol %, and the predetermined volume percent of the resistive material ranges from 1.85 vol % to about 3.0 vol %; or the predetermined volume percent of the conductive material ranges from about 0.5 vol % to about 1.8 vol %, and the predetermined volume percent of the resistive material ranges from 3.0 vol % to about 3.1 vol %.

In one of these examples, the electrical conductivity value is within a range of from 1 S/m to 1.E-03 S/m; the predetermined volume percent of the conductive material ranges from about 0.1 vol % to about 0.9 vol %; and the predetermined volume percent of the resistive material ranges from 1.85 vol % to about 3.0 vol %.

In another of these examples, the electrical conductivity value is within a range of from 1 S/m to 1.E-03 S/m; the predetermined volume percent of the conductive material ranges from about 0.5 vol % to about 1.8 vol %; and the predetermined volume percent of the resistive material ranges from 3.0 vol % to about 3.1 vol %.

The predetermined volume percentages that are provided in these examples are based upon the desired volume percentage in the printed resistor, which will achieve a desirable conductivity, and thus a desirable resistivity. It is to be understood that the volume percent of the conductive material and the volume percent of the resistive material in the printed resistor are higher than the respective volume percentages of the respective material deposited during 3D printing. This is due to the build material having an effective packing density. The following calculations may be used to determine how much of the conductive agent and/or resistive agent are/is to be deposited in a particular voxel area of the build material in order to achieve the predetermined volume percentages in the resulting resistor.

The mass fraction of the conductive agent or the resistive agent may be determined using Eq. 1:

$$\text{Mass Fraction} = \frac{\text{Mass of conductive or resistive agent deposited in a voxel area}}{\text{total mass of material in the voxel area}}$$

In Eq. 1, the mass of the conductive agent or the resistive agent in the voxel area is calculated from the voxel area, the amount of agent applied, the solid loading in the agent, the density of the agent, and the volume of the drop of the agent. In an example, the amount of the agent applied is equal to the number of drops of agent divided by the voxel. In an example, the voxel is 1200 dpi in x and y, which is about 21 μm in x and y and 80 μm in z.

Also in Eq. 1, the total mass of material in the voxel area is equal to the mass of the build material in the voxel area plus the mass of the conductive or resistive agent.

The volume percentage of the conductive or resistive material in the build material may be determined using in Eq. 2:

$$Vol.\ \%\ in\ BM = \left(\frac{Mass\ Fraction * Density\ of\ Part * BMPD}{Density\ of\ Conductive\ or\ Resistive\ Agent}\right) * 100$$

In Eq. 2, the BMPD is the build material packing density, which may be from about 0.3 to about 0.65. In other examples, the BMPD may be from about 0.4 to about 0.6, or about 0.5. The BMPD may vary slightly due, in part, to the different particle size, particle shape, and additives of build material compositions. In Eq. 2, it is assumed that the density of the part is roughly equivalent to the density of the build material that is used.

The volume percentage of the conductive or resistive material in the part may be determined using in Eq. 3:

$$Vol.\ \%\ in\ Part = (Mass\ Fraction) * \left(\frac{Density\ of\ Part}{Density\ of\ Conductive\ or\ Resistive\ Agent}\right) * 100$$

Printing with Conductive Agents and Resistive Agents to Form the Resistor

Figure 4:
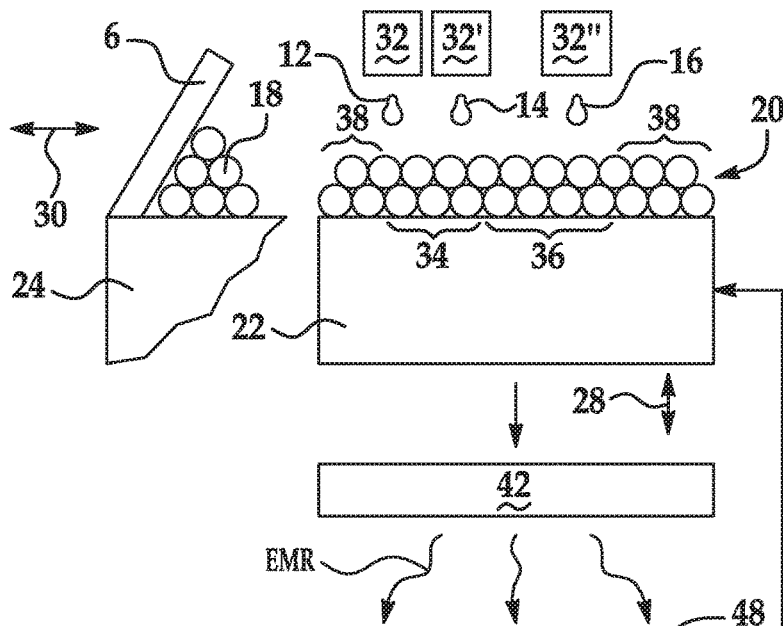
FIG. 4 is a graphic illustration of one example of the 3D printing method.
Figure 4:
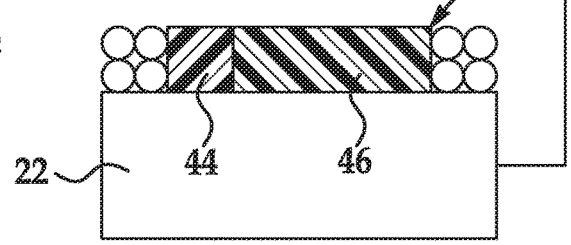

Referring now to FIG. 4, an example of the method 100 which utilizes the conductive agent 12 and the resistive agent 14 is depicted.

In FIG. 4, a layer 20 of the build material composition 18 is applied on a build area platform 22. A printing system may be used to apply the build material composition 18. The printing system may include the build area platform 22, a build material supply 24 containing the build material composition 18, and a build material distributor 26.

The build area platform 22 receives the build material composition 18 from the build material supply 24. The build area platform 22 may be moved in the directions as denoted by the arrow 28, e.g., along the z-axis, so that the build material composition 18 may be delivered to the build area platform 22 or to a previously formed layer. In an example, when the build material composition 18 is to be delivered, the build area platform 22 may be programmed to advance (e.g., downward) enough so that the build material distributor 26 can push the build material composition 18 onto the build area platform 22 to form a substantially uniform layer of the build material composition 18 thereon. The build area platform 22 may also be returned to its original position, for example, when a new part is to be built.

The build material supply 24 may be a container, bed, or other surface that is to position the build material composition 18 between the build material distributor 26 and the build area platform 22. The build material supply 24 may include heaters so that the build material composition 18 is heated to a supply temperature ranging from about 25° C. to about 150° C. In these examples, the supply temperature may depend, in part, on the build material composition 18 used and/or the 3D printer used. As such, the range provided is one example, and higher or lower temperatures may be used.

The build material distributor 26 may be moved in the directions as denoted by the arrow 30, e.g., along the y-axis, over the build material supply 24 and across the build area platform 22 to spread the layer 20 of the build material composition 18 over the build area platform 22. The build material distributor 26 may also be returned to a position adjacent to the build material supply 24 following the spreading of the build material composition 18. The build material distributor 26 may be a blade (e.g., a doctor blade), a roller, a combination of a roller and a blade, and/or any other device capable of spreading the build material composition 18 over the build area platform 22. For instance, the build material distributor 26 may be a counter-rotating roller.

In some examples, the build material supply 24 or a portion of the build material supply 24 may translate along with the build material distributor 26 such that build material composition 18 is delivered continuously to the material distributor 26 rather than being supplied from a single location at the side of the printing system as depicted in FIG. 4.

The build material supply 24 may supply the build material composition 18 into a position so that it is ready to be spread onto the build area platform 22. The build material distributor 26 may spread the supplied build material composition 18 onto the build area platform 22. The controller (not shown) may process "control build material supply" data, and in response, control the build material supply 24 to appropriately position the particles of the build material composition 18, and may process "control spreader" data, and in response, control the build material distributor 26 to spread the build material composition 18 over the build area platform 22 to form the layer 20 of the build material composition 18 thereon. In FIG. 4, one build material layer 20 has been formed.

The layer 20 has a substantially uniform thickness across the build area platform 22. In an example, the build material layer 20 has a thickness ranging from about 50 μm to about 120 μm. In another example, the thickness of the build material layer 20 ranges from about 30 μm to about 300 μm. It is to be understood that thinner or thicker layers may also be used. For example, the thickness of the build material layer 20 may range from about 20 μm to about 500 μm. The layer thickness may be about 2× (i.e., 2 times) the average diameter of the build material composition particles at a minimum for finer part definition. In some examples, the layer 20 thickness may be about 1.2× the average diameter of the build material composition particles.

After the build material composition 18 has been applied, and prior to further processing, the build material layer 20 may be exposed to pre-heating. In an example, the pre-heating temperature may be below the melting point of the polymer of the build material composition 18. In another example, the pre-heating temperature may be below the lowest temperature in the melting range of the polymer of the build material composition 18. As such, the temperature selected for pre-heating will depend upon the polymer that is used.

As examples, the pre-heating temperature may range from about 5° C. to about 50° C. below the melting point of the polymer or from about 5° C. to about 50° C. below the lowest temperature in the melting range of the polymer. In an example, the pre-heating temperature ranges from about 50° C. to about 205° C. In another example, the pre-heating temperature ranges from about 100° C. to about 205° C. In still another example, the pre-heating temperature ranges from about 100° C. to about 190° C. The low pre-heating temperature may enable the non-patterned build material composition 18 to be easily removed from the 3D object after completion of the 3D object. In these examples, the pre-heating temperature may depend, in part, on the build material composition 18 used. As such, the ranges provided are some examples, and higher or lower temperatures may be used.

Pre-heating the layer 20 may be accomplished by using any suitable heat source that exposes all of the build material composition 18 in the layer 20 to the heat. Examples of the heat source include a thermal heat source (e.g., a heater (not shown) integrated into the build area platform 22 (which may include sidewalls)) or a radiation source 42.

After the build material layer 20 is formed, and in some instances is pre-heated, the conductive agent 12 and the resistive agent 14 are selectively applied on at least a portion 34 of the build material layer 20. The at least the portion 34 of the build material layer 20 is the portion that is to form the layer of the resistor 44.

The conductive agent 12 is selectively applied in a predetermined amount so that a predetermined volume percentage of the conductive material is contained in the resistor 44. The predetermined volume percentage of the conductive material is based on the electrical conductivity value desired for the resistor 44. As such, the predetermined amount of the conductive agent 12 depends, at least in part, on the desired electrical conductivity value, and the amount of the conductive material in the conductive agent 12. When the resistor 44 is made up of several build material layers 20, the predetermined amount of the conductive agent 12 applied to any one build material layer 20 is a fraction of the total amount needed to impart the predetermined volume percentage of the conductive material to the final resistor 44.

Similarly, the resistive agent 14 is selectively applied in a predetermined amount so that a predetermined volume percentage of the resistive material is contained in the resistor 44. The predetermined volume percentage of the resistive material is based on the electrical conductivity value desired for the resistor 44 and the predetermined volume percent of the conductive material that is being used. As such, the predetermined amount of the resistive agent 14 depends, at least in part, on the desired electrical conductivity value, the amount of the resistive material in the resistive agent 14, and the predetermined volume percent of the conductive material. When the resistor 44 is made up of several build material layers 20, the predetermined amount of the resistive agent 14 applied to any one build material layer 20 is a fraction of the total amount needed to impart the predetermined volume percentage of the resistive material to the final resistor 44.

With an identified desirable conductivity for the resistor 44, the examples disclosed herein may be used to determine the volume percentages of each of the agents 12, 14 in the resistor 44 that will achieve this conductivity, and Eq. 2 may be used to determine the volume percentages of each of the agents 12, 14 that should be applied to the totality of the build material layers 20 that will be used to define the resistor 44.

It is to be understood that the predetermined amount of the conductive agent 12 may be the same as or different than the predetermined amount of the resistive agent 14. It is further to be understood that conductive agent 12 and the resistive agent 14 may be selectively applied in any order or may be applied substantially simultaneously. Still further, it is to be understood that in the examples of the method 100 shown in FIG. 4, no fusing agent 16 is applied on the portion 34.

In some examples of the method 100, a detailing agent (not shown) may also be selectively applied on the at least the portion 34 of the build material layer 20. It may be desirable to selectively apply the detailing agent on the portion 34 when the conductive material is an energy absorber and the predetermined volume percentage of the conductive material is such that the heat from the radiation absorbed by the conductive material is greater than the cooling effect provided by the liquid vehicle of the conductive agent (e.g., a predetermined volume percentage of about 0.75 vol %) and/or when the resistive material is an energy absorber and the predetermined volume percentage of the resistive material is such that the heat from the radiation absorbed by the resistive material is greater than the cooling effect provided by the liquid vehicle of the resistive agent (e.g., a predetermined volume percentage of about 0.05 vol %).

The detailing agent may provide an evaporative cooling effect to the build material composition 18 to which it is applied. The cooling effect of the detailing agent reduces the temperature of the build material composition 18 containing the detailing agent during radiation exposure. The detailing agent, and its rapid cooling effect, may be used to prevent over-heating of the build material composition 18 when a high amount of conductive material and/or resistive material, acting as energy absorber(s), are applied to achieve the desired electrical conductivity value.

In some examples of the method 100, the fusing agent 16 may be selectively applied on another portion 36 of the build material layer 20. The other portion 36 of the build material layer 20 may form a region of the 3D object layer 48 that is not part of the resistor 44.

The volume of the fusing agent 16 that is applied per unit of the build material composition 18 in the other portion 36 may be sufficient to absorb and convert enough electromagnetic radiation so that the build material composition 18 in the other portion 36 will coalesce/fuse. The volume of the fusing agent 16 that is applied per unit of the build material composition 18 may depend, at least in part, on the energy absorber used, the energy absorber loading in the fusing agent 16, and the build material composition 18 used.

In other examples of the method 100 (not shown), the fusing agent 16 is not applied on any portion of the build material layer 20. In these examples, the resistor 44 will form the entire 3D object layer.

In still some other examples of the method 100 (not shown), the conductive agent 12 alone (if the conductive material is an energy absorber) or the conductive agent 12 and the fusing agent 16 may be selectively applied on a portion of the build material layer 20 adjacent to the portion 34. This may be used to form a conductive trace or conductive contact pad adjacent to the resistor 44. The conductive trace or conductive contact pad may allow probes, etc. to connect to the resistor 44. The conductive traces or contact pads may also include a plurality of layers. In other words, adjacent build material layers 20 are patterned with the conductive agent 12 alone (if the conductive material is an energy absorber) or the conductive agent 12 and the fusing agent 16 to define the conductive traces or contact pads.

In other examples of the method 100, the conductive trace or conductive contact pad may be formed using the resistive agent 14 as an energy absorber. As mentioned above, in these examples, the resistive material may act as a process control agent and raise the temperature of the build material composition 18, which can speed up the printing of the conductive trace or conductive contact pad.

None of the agents 12, 14, 16 are applied on the portions 38. As such, the non-patterned portions 38 will not become part of the 3D object.

In some examples, the detailing agent (not shown) may be selectively applied on the portions 38. In these examples, the evaporative cooling effect of the detailing agent may be utilized to aid in preventing the build material composition 18 in the portions 38 from coalescing/fusing. The evaporative cooling provided by the detailing agent may remove energy from the portions 38, which may lower the temperature of the build material composition 18 in the portions 38 and prevent the build material composition 18 in the portions 38 from coalescing/fusing.

After the agents 12, 14, and 16 are selectively applied in the specific portion(s) 34, 36 of the layer 20, the entire layer 20 of the build material composition 18 is exposed to electromagnetic radiation (shown as EMR in FIG. 4).

The electromagnetic radiation is emitted from the radiation source 42. The length of time the electromagnetic radiation is applied for, or energy exposure time, may be dependent, for example, on one or more of: characteristics of the radiation source 42; characteristics of the build material composition 18; and/or characteristics of the conductive agent 12, the resistive agent 14, and/or fusing agent 16.

It is to be understood that the electromagnetic radiation exposure may be accomplished in a single radiation event or in multiple radiation events. In an example, the exposing of the build material composition 18 is accomplished in multiple radiation events. In a specific example, the number of radiation events ranges from 3 to 8. It may be desirable to expose the build material composition 18 to electromagnetic radiation in multiple radiation events to counteract a cooling effect that may be brought on by the amount of the agents 12, 14, 16 that is applied to the build material layer 20. Additionally, it may be desirable to expose the build material composition 18 to electromagnetic radiation in multiple radiation events to sufficiently elevate the temperature of the build material composition 18 in the portion(s) 34, 36 without over heating the build material composition 18 in the non-patterned portion(s) 38.

In the examples of the method 100 shown in FIG. 4, the conductive agent 12 and/or the resistive agent 14 enhances the absorption of the radiation, converts the absorbed radiation to thermal energy, and promotes the transfer of the thermal heat to the build material composition 18 in contact therewith. In an example, the conductive agent 12 and/or the resistive agent 14 sufficiently elevates the temperature of the build material composition 18 in the portion 34 so that the build material composition 18 coalesces/fuses. In some examples of the method 100, the fusing agent 16 also enhances the absorption of the radiation, converts the absorbed radiation to thermal energy, and promotes the transfer of the thermal heat to the build material composition 18 in contact therewith. In an example, the fusing agent 16 sufficiently elevates the temperature of the build material composition 18 in the portion 36 so that the build material composition 18 coalesces/fuses. The application of the electromagnetic radiation forms the 3D object layer 48.

In some examples, the electromagnetic radiation has a wavelength ranging from 300 nm to 4000 nm, or from 800 nm to 1400 nm, or from 800 nm to 1200 nm. Radiation having wavelengths within the provided ranges may be absorbed (e.g., 80% or more of the applied radiation is absorbed) by the conductive agent 12 and/or the resistive agent 14 and the fusing agent 16 and may heat the build material composition 18 in contact therewith, and may not be substantially absorbed (e.g., 25% or less of the applied radiation is absorbed) by the non-patterned build material composition 18 in portions 38.

In the example shown in FIG. 4, the 3D object layer 48 includes a layer of a resistor 44 (which corresponds with portion 34 patterned with both the conductive agent 12 and the resistive agent 14) and a portion 46 with unaltered electrical properties (which corresponds with the portion 36 patterned with the fusing agent 16 alone).

After the 3D object layer 48 is formed, additional layer(s) may be formed thereon to create an example of the 3D object. To form the next layer, additional build material composition 18 may be applied on the layer 48. Then, the conductive agent 12 and the resistive agent 14 are selectively applied on at least a portion of the additional build material composition 18 and/or the fusing agent 16 is selectively applied on at least a portion of the additional build material composition 18, according to the 3D object model. After the agent(s) 12, 14, 16 is/are applied, the entire layer of the additional build material composition 18 is exposed to electromagnetic radiation in the manner described herein. The application of additional build material composition 18, the selective application of the agent(s) 12, 14, 16, and the electromagnetic radiation exposure may be repeated a predetermined number of cycles to form the final 3D object in accordance with the 3D object model.

While the resistor 44 is shown in FIG. 4 as a single layer, it is to be understood that multiple layers (e.g., 5 or more layers) may be used to form the resistor 44. In some examples, the resistor 44 may have any length, width, or height that will fit within a volume of about 100 cubic micrometers.

Figure 5:
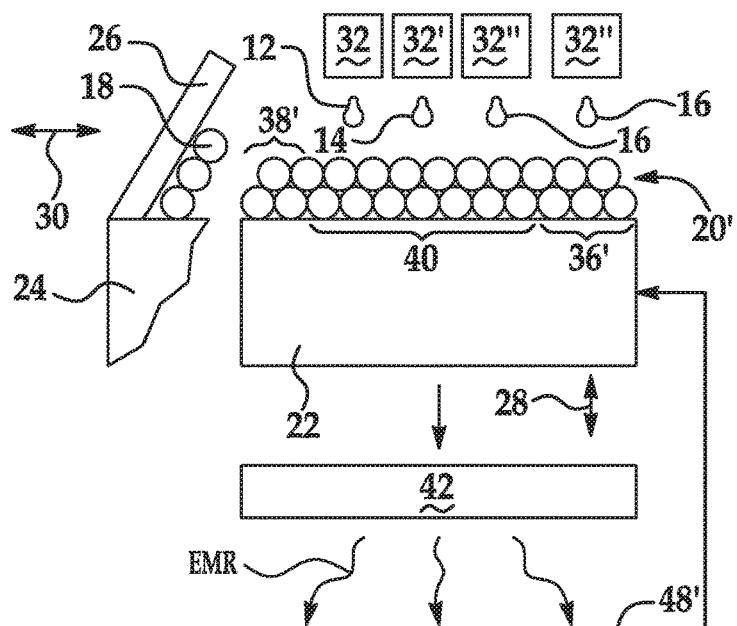
FIG. 5 is a graphic illustration of another example of the 3D printing method.
Figure 5:
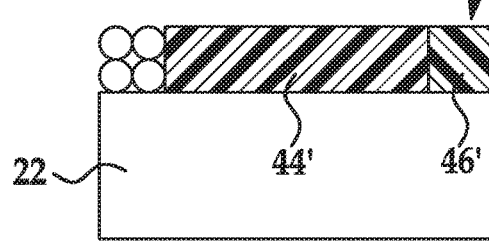

Printing with Conductive Agents, Resistive Agents, and Fusing Agents to Form the Resistor Referring now to FIG. 5, an example of the method 200 which utilizes the conductive agent 12, the resistive agent 14, and the fusing agent 16 is depicted.

In FIG. 5, a layer 20' of the build material composition 18 is applied on the build area platform 22 as described in reference to FIG. 4 (e.g., from build material supply 24 and using build material distributor 26). The layer 20' has a substantially uniform thickness across the build area platform 22.

After the build material composition 18 has been applied, and prior to further processing, the build material layer 20' may be exposed to pre-heating in the manner described herein in reference to FIG. 4.

After the layer 20' is formed, and in some instances is pre-heated, the conductive agent 12, the resistive agent 14, and the fusing agent 16 are selectively applied on at least a portion 40 of the build material layer 20'. The at least the portion 40 of the build material layer 20' is the portion that is to form the layer of the resistor 44'.

The conductive agent 12 is selectively applied in a predetermined amount so that a predetermined volume percentage of the conductive material is contained in the resistor 44'. The predetermined volume percentage of the conductive material is based on the electrical conductivity value desired for the resistor 44'. As such, the predetermined amount of the conductive agent 12 depends, at least in part, on the desired electrical conductivity value, and the amount of the conductive material in the conductive agent 12. When the resistor 44' is made up of several build material layers 20', the predetermined amount of the conductive agent 12 applied to any one build material layer 20' is a fraction of the total amount needed to impart the predetermined volume percentage of the conductive material to the final resistor 44'.

Similarly, the resistive agent 14 is selectively applied in a predetermined amount so that a predetermined volume percentage of the resistive material is contained in the resistor 44'. The predetermined volume percentage of the resistive material is based on the electrical conductivity value desired for the resistor 44' and the predetermined volume percent of the conductive material. As such, the predetermined amount of the resistive agent 14 depends, at least in part, on the desired electrical conductivity value, the amount of the resistive material in the resistive agent 14, and the predetermined volume percent of the conductive material. When the resistor 44' is made up of several build material layers 20', the predetermined amount of the resistive agent 14 applied to any one build material layer 20' is a fraction of the total amount needed to impart the predetermined volume percentage of the resistive material to the final resistor 44'.

With an identified desirable conductivity for the resistor 44', the examples disclosed herein may be used to determine the volume percentages of each of the agents 12, 14 in the resistor 44' that will achieve this conductivity, and Eq. 2 may be used to determine the volume percentages of each of the agents 12, 14 that should be applied to the totality of the build material layer(s) 20' used to define the resistor 44'.

The volume of the fusing agent 16 that is applied per unit of the build material composition 18 in the portion 40 may be sufficient to absorb and convert enough electromagnetic radiation so that the build material composition 18 in the portion 40 will coalesce/fuse. The volume of the fusing agent 16 that is applied per unit of the build material composition 18 may depend, at least in part, on the energy absorber used, the energy absorber loading in the fusing agent 16, and the build material composition 18 used. When the energy absorber in the fusing agent 16 is the same as the resistive material or the conductive material, it is to be understood that the amount of the resistive agent 14 or the conductive agent 12 may be adjusted so that the total volume of the resistive material or the conductive material introduced to the resistor 44' is a suitable percentage to achieve the desirable conductivity. In other examples, the fusing agent 16 may include an energy absorber that does not affect the conductivity.

It is to be understood that the predetermined amount of the conductive agent 12 may be the same as or different than the predetermined amount of the resistive agent 14. It is further to be understood that conductive agent 12, the resistive agent 14, and the fusing agent may be selectively applied in any order or may be applied substantially simultaneously.

In some examples of the method 200, the fusing agent 16 is also selectively applied on another portion 36' of the build material layer 20'. The other portion 36' of the build material layer 20' is the portion that is to form a region of the 3D object layer 48' but that is not to be part of the resistor 44'.

In other examples of the method 200 (not shown), the fusing agent 16 is not applied on the other portion of the build material layer 20'. In these examples, the resistor 44' will form the entire 3D object layer.

In some examples of the method 200 (not shown), the conductive agent 12 and the fusing agent 16 may be selectively applied on a portion of the build material layer 20' adjacent to the portion 34'. In these examples, a conductive trace or conductive contact pad may be formed adjacent to (and in contact with) the resistor 44'. As mentioned above, the conductive trace or conductive contact pad may allow probes, etc. to electrically connect to the resistor 44'.

None of the agents 12, 14, 16 are applied on the portion 38'. As such, the non-patterned portion 38' will not become part of the 3D object.

In some examples, the detailing agent (not shown) may be selectively applied on the portions 38'. In these examples, the evaporative cooling effect of the detailing agent may be utilized to aid in preventing the build material composition 18 in the portions 38' from coalescing/fusing.

After the agents 12, 14, and 16 are selectively applied in the specific portion(s) 40 of the layer 20', the entire layer 20' of the build material composition 18 is exposed to electromagnetic radiation (shown as EMR in FIG. 5) as described herein. The fusing agent 16 enhances the absorption of the radiation, converts the absorbed radiation to thermal energy, and promotes the transfer of the thermal heat to the build material composition 18 in contact therewith. In an example, the fusing agent 16 sufficiently elevates the temperature of the build material composition 18 in the portion 40 so that the build material composition 18 coalesces/fuses.

The application of the electromagnetic radiation forms the 3D object layer 48'. In the example shown in FIG. 5, the 3D object layer 48' includes a layer of the resistor 44' (which corresponds with portion 40 patterned with each of the conductive agent 12, the resistive agent 14, and the fusing agent 16) and a portion 46' with unaltered electrical properties (which corresponds with the portion 36' patterned with the fusing agent 16 alone).

After the 3D object layer 48' is formed, additional layer(s) may be formed thereon to create an example of the 3D object. To form the next layer, additional build material composition 18 may be applied on the layer 48'. The fusing agent 16 is then selectively applied on at least a portion of the additional build material composition 18, according to the 3D object model. The conductive agent 12 and the resistive agent 14 may also be applied, for example, if a resistor is desired in the next layer. After the agent(s) 12, 14, 16 is/are applied, the entire layer of the additional build material composition 18 is exposed to electromagnetic radiation in the manner described herein. The application of additional build material composition 18, the selective application of the agent(s) 12, 14, 16, and the electromagnetic radiation exposure may be repeated a predetermined number of cycles to form the final 3D object in accordance with the 3D object model.

While the resistor 44' is shown in FIG. 5 as a single layer, it is to be understood that multiple layers (e.g., 5 or more layers) may be used to form the resistor 44'. In an example, the resistor 44' may have any length, width, or height that will fit within a volume of about 100 cubic micrometers.

Printing with Conductive Agents and Resistive Agents using SLS

Figure 6:
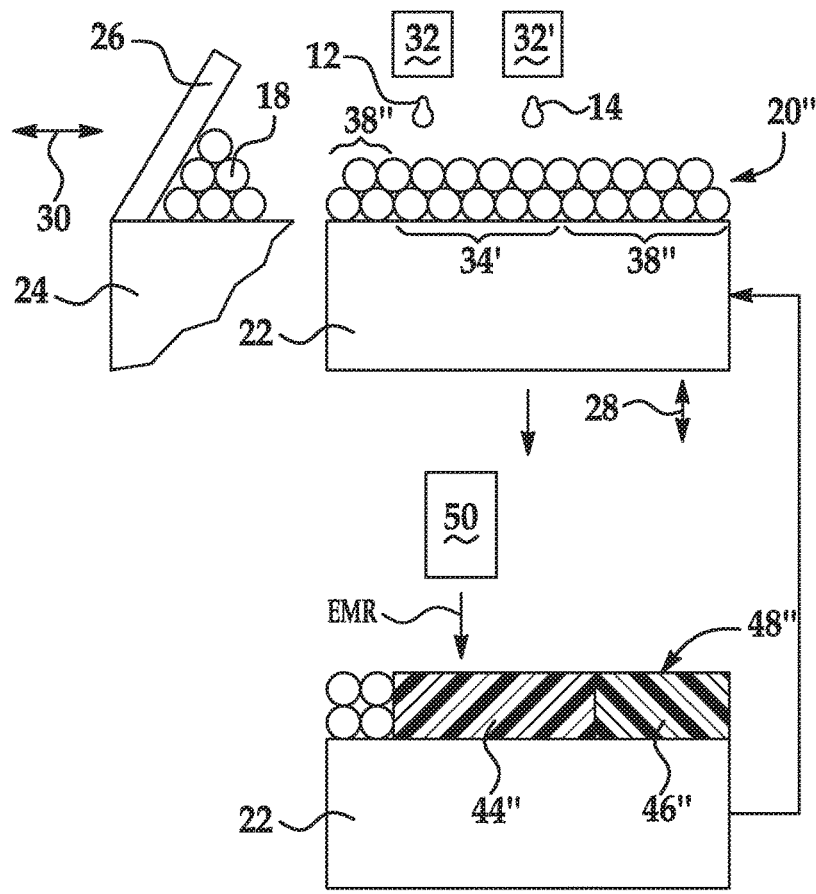
FIG. 6 is a graphic illustration of still another example of the 3D printing method.

Referring now to FIG. 6, an example of the method 300 is depicted which utilizes the conductive agent 12, the resistive agent 14, and selective laser sintering (SLS). In this method 300, no fusing agent 16 is applied on the build material composition 18. Rather, an energy beam 50 is used to selectively apply radiation to the portions of the build material composition 18 that are to coalesce/fuse to become part of the object.

In FIG. 6, a layer 20" of the build material composition 18 is applied on the build area platform 22 as described in reference to FIG. 4 (e.g. from build material supply 24 and using build material distributor 26). The layer 20" has a substantially uniform thickness across the build area platform 22.

After the build material composition 18 has been applied, and prior to further processing, the build material layer 20"

may be exposed to pre-heating in the manner described herein in reference to FIG. 4.

After the build material layer 20" is formed, and in some instances is pre-heated, the conductive agent 12 and the resistive agent 14 are selectively applied on at least a portion 34' of the build material layer 20". The at least the portion 34' of the build material layer 20" is the portion that is to form the layer of the resistor 44".

The conductive agent 12 is selectively applied in a predetermined amount so that a predetermined volume percentage of the conductive material is contained in the resistor 44". The predetermined volume percentage of the conductive material is based on the electrical conductivity value desired for the resistor 44". As such, the predetermined amount of the conductive agent 12 depends, at least in part, on the desired electrical conductivity value, and the amount of the conductive material in the conductive agent 12. When the resistor 44" is made up of several build material layers 20", the predetermined amount of the conductive agent 12 applied to any one build material layer 20" is a fraction of the total amount needed to impart the predetermined volume percentage of the conductive material to the final resistor 44".

Similarly, the resistive agent 14 is selectively applied in a predetermined amount so that a predetermined volume percentage of the resistive material is contained in the resistor 44". The predetermined volume percentage of the resistive material is based on the electrical conductivity value desired for the resistor 44" and the predetermined volume percent of the conductive material. As such, the predetermines amount of the resistive agent 14 depends, at least in part, on the desired electrical conductivity value, the amount of the resistive material in the resistive agent 14, and the predetermined volume percent of the conductive material. When the resistor 44" is made up of several build material layers 20", the predetermined amount of the resistive agent 14 applied to any one build material layer 20" is a fraction of the total amount needed to impart the predetermined volume percentage of the resistive material to the final resistor 44".

With an identified desirable conductivity for the resistor 44", the examples disclosed herein may be used to determine the volume percentages of each of the agents 12, 14 in the resistor 44" that will achieve this conductivity, and Eq. 2 may be used to determine the volume percentages of each of the agents 12, 14 that should be applied to the totality of build material layer(s) 20" used to define the resistor 44".

It is to be understood that the predetermined amount of the conductive agent 12 may be the same as or different than the predetermined amount of the resistive agent 14. It is further to be understood that conductive agent 12 and the resistive agent 14 may be selectively applied in any order or may be applied substantially simultaneously.

In some examples of the method 300 (not shown), the conductive agent 12 alone may be selectively applied on a portion of the build material layer 20" adjacent to the portion 34". In these examples, a conductive trace or conductive contact pad may be formed adjacent to (and in contact with) the resistor 44". As mentioned above, the conductive trace or conductive contact pad may allow probes, etc. to electrically connect to the resistor 44".

None of the agents 12, 14, 16 are applied on the portions 38".

After the agents 12, 14 are selectively applied in the specific portion(s) 34', the build material layer 20" is selectively exposed to radiation from an energy beam 50. In this example, the source of electromagnetic radiation may be a laser or other tightly focused energy source that may selectively apply radiation (shown as EMR in FIG. 6) to the build material layer 20". The laser may emit light through optical amplification based on the stimulated emission of radiation. The laser may emit light coherently (i.e., constant phase difference and frequency), which allows the radiation to be emitted in the form of a laser beam that stays narrow over large distances and focuses on a small area. In some examples, the laser or other tightly focused energy source may be a pulse laser (i.e., the optical power appears in pluses). Using a pulse laser allows energy to build between pluses, which enables the beam to have more energy. A single laser or multiple lasers may be used.

The radiation from the energy beam 50 heats the build material composition 18 exposed thereto. In an example, the energy beam 50 sufficiently elevates the temperature of the build material composition 18 exposed to radiation therefrom so that the build material composition 18 coalesces/fuses.

The exposure to radiation from the energy beam 50 forms the 3D object layer 48". In the example shown in FIG. 6, the 3D object layer 48" includes a layer of the resistor 44" (which corresponds with portion 34' patterned with both the conductive agent 12 and the resistive agent 14, and exposed to the radiation) and a portion 46" with unaltered electrical properties (which was exposed to the radiation alone).

After the 3D object layer 48" is formed, additional layer(s) may be formed thereon to create an example of the 3D object. To form the next layer, additional build material composition 18 may be applied on the layer 48". The conductive agent 12 and the resistive agent 14 may be applied, for example, if a resistor is desired in the next layer or if the resistor is being built up in the z direction. After the agent(s) 12, 14, are applied, the additional build material composition 18 is selectively exposed to electromagnetic radiation in the manner described herein. The application of additional build material composition 18, the selective application of the agent(s) 12, 14, and the selective electromagnetic radiation exposure may be repeated a predetermined number of cycles to form the final 3D object in accordance with the 3D object model.

While the resistor 44" is shown in FIG. 6 as a single layer, it is to be understood that multiple layers (e.g., 5 or more layers) may be used to form the resistor 44". As such, the resistor 44" may have any length, width, or height that will fit within a volume of about 100 cubic micrometers.

In any of the examples of the methods 100, 200, 300 disclosed herein, any of the agents 12, 14, 16 may be dispensed from an applicator 32, 32', 32" (as shown in FIGS. 4 through 6). The applicator(s) 32, 32', 32" may each be a thermal inkjet printhead, a piezoelectric printhead, a continuous inkjet printhead, etc., and the selective application of the agent(s) 12, 14, 16 may be accomplished by thermal inkjet printing, piezo electric inkjet printing, continuous inkjet printing, etc. The controller may process data, and in response, control the applicator(s) 32, 32', 32" to deposit the agent(s) 12, 14, 16 onto predetermined portion(s) of the build material composition 18. It is to be understood that the applicators 32, 32', 32" may be separate applicators or a single applicator with several individual cartridges for dispensing the respective agents 12, 14, 16.

It is to be understood that the selective application of any of the agents 12, 14, 16 may be accomplished in a single printing pass or in multiple printing passes. In some examples, the agent(s) 12, 14, 16 is/are selectively applied in a single printing pass. In some other examples, the agent(s) 12, 14, 16 is/are selectively applied in multiple printing passes. In one of these examples, the number of printing passes ranging from 2 to 4. It may be desirable to apply the agent(s) 12, 14, 16 in multiple printing passes to increase the amount, e.g., of the conductive material, resistive material, energy absorber, etc. that is applied to the build material composition 18, to avoid liquid splashing, to avoid displacement of the build material composition 18, etc.

In any of the examples of the methods 100, 200, 300 disclosed herein, differently shaped objects may be printed in different orientations within the printing system. As such, while the object may be printed from the bottom of the object to the top of the object, it may alternatively be printed starting with the top of the object to the bottom of the object, or from a side of the object to another side of the object, or at any other orientation that is suitable or desired for the particular geometry of the part being formed.

It is believed that any of the methods 100, 200, 300 disclosed herein may be used to print resistors having a resistance ranging from about 1 ohm ($\Omega$) to about 100 mega-ohms (M$\Omega$) (i.e., having a conductance ranging from about 1 S to about 0.01 MS) within a volume of about 100 cubic micrometers. As such, the examples disclosed herein enable 9+ orders of magnitude of resistivity or conductivity to be achieved.

The printing methods 100, 200, 300 may be used to print different electronic components which include a resistive element, such as a heater, resistive touch sensor, piezoresistive pressure sensors, etc. The printing methods 100, 200, 300 disclosed herein easily integrate the formation of resistors with other components, such as conductive traces, that are being 3D printed.

To further illustrate the present disclosure, an example is given herein. It is to be understood that this example is provided for illustrative purposes and is not to be construed as limiting the scope of the present disclosure.

Example

Several example 3D objects including eight independently addressable resistors were printed. Each resistor had a length of 5 mm (in the y direction), a height of 0.75 mm (in the z direction), and a width of 1 mm (in the x direction). Each resistor was also printed with conductive contact pads at each end of the resistor.

To print the 3D objects, 80 µm thick layers of a polyamide 12 build material were used. Different loadings of an example conductive agent and different loadings of an example resistive agent were applied to form each of the resistors. To form the resistors, the example conductive agent was applied so that 0.00 vol %, 0.61 vol %, 1.15 vol %, 1.62 vol %, 2.05 vol %, 2.43 vol %, 2.46 vol %, 3.92 vol %, or 4.89 vol % of the conductive material was obtained in the final part, and the example resistive agent was applied so that 0.00 vol %, 0.19 vol %, 0.37 vol %, 0.74 vol %, 1.54 vol %, 1.72 vol %, 1.89 vol %, 2.24 vol %, or 3.01 vol % of the resistive material was obtained in the final part. The example conductive agent included silver nanoparticles as the conductive material, and the example resistive agent included carbon black as the resistive material. To form each of the conductive contact pads, the example conductive agent was applied so that 4.89 vol % of the conductive material (i.e., the silver nanoparticles) was present in the conductive contact pad. An example fusing agent including a nickel dithiolene complex as the energy absorber was applied on the portions of the 3D objects that were not to form a resistor or a conductive contact pad. After the example agents were applied, each layer was exposed to electromagnetic radiation to coalesce/fuse the layer.

After the 3D objects were printed, each of the conductive contact pads was coated in silver solder paste and cured in an oven at 160° C. This was done to control the contact resistance when probing the printed resistors.

Figure 7:
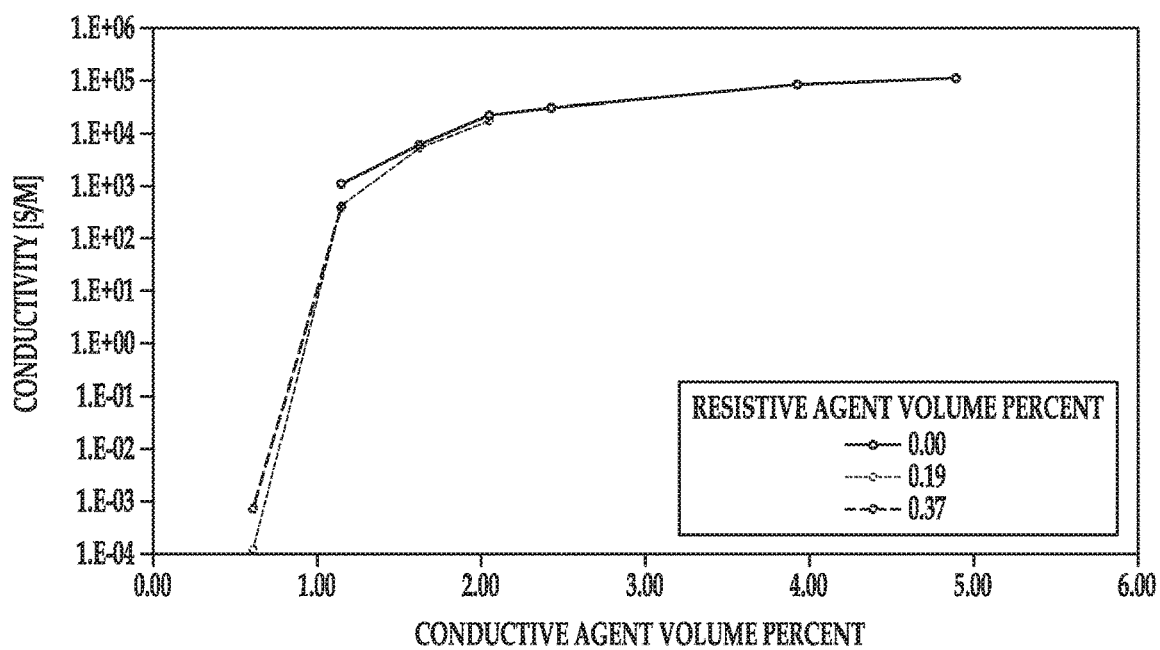
FIG. 7 is a graph illustrating the conductivity (in S/m, y-axis) of resistors as a function of the amount of conductive material (in vol %, x-axis) when a low amount of the resistive material is used.
Figure 8:
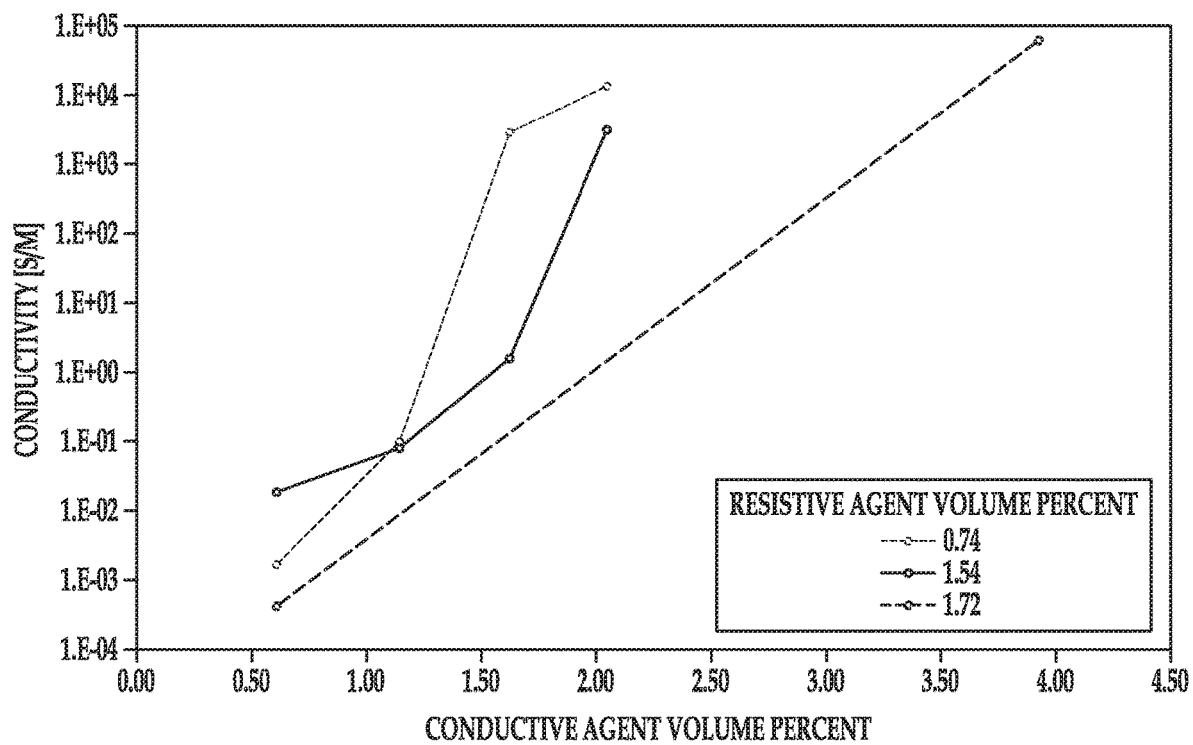
FIG. 8 is a graph illustrating the conductivity (in S/m, y-axis) of resistors as a function of the amount of conductive material (in vol %, x-axis) when a moderate amount of the resistive material is used.
Figure 9:
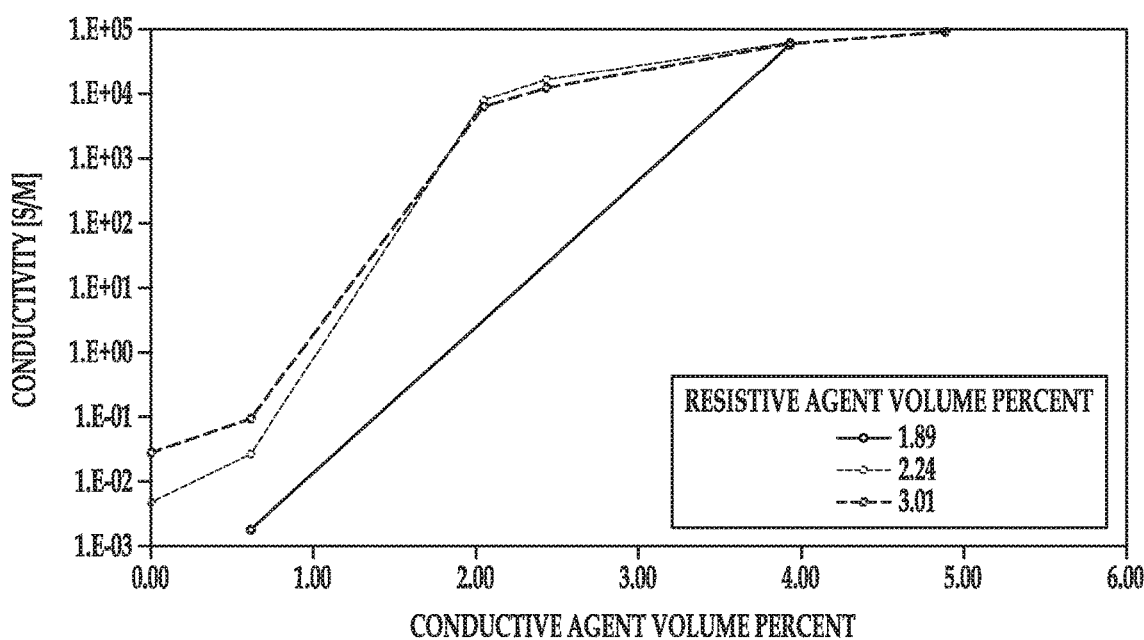
FIG. 9 is a graph illustrating the conductivity (in S/m, y-axis) of resistors as a function of the amount of conductive material (in vol %, x-axis) when a high amount of the resistive material is used.

After the silver solder paste was cured, the resistance across each resistor was measured and the conductivity was calculated using the dimensions of the resistors. The results of the conductivity calculations are shown in FIGS. 7 through 9. In FIGS. 7 through 9, the conductivity of the resistor (in S/m) is shown on the y-axis, the amount of the conductive material (i.e., silver nanoparticles) in each layer of the resistor (in vol %) is shown on the x-axis, and the amount of the resistive material (i.e., carbon black) in each layer of the resistor (in vol %) is identified in the graph key.

FIG. 7 shows the conductivity of the resistor as a function of the amount of conductive material when a low amount (i.e., 0.0 vol %, 0.19 vol %, or 0.37 vol %) of the resistive material is used. FIG. 8 shows the conductivity of the resistor as a function of the amount of conductive material when a moderate amount (i.e., 0.74 vol %, 1.54 vol %, or 1.72 vol %) of the resistive material is used. FIG. 9 shows the conductivity of the resistor as a function of the amount of conductive material when a high amount (i.e., 1.89 vol %, 2.24 vol %, or 3.01 vol %) of the resistive material is used.

As shown in FIGS. 7 through 9, a desired resistance may be achieved by introducing a predetermined volume percentage of a conductive material and a predetermined volume percentage of a resistive material to the resistor. As also shown in FIGS. 7 through 9, when high amounts (e.g., 3.92 vol %) of the conductive material were introduced to the resistor, the introduction any amount of the resistive material resulted in almost no change in conductivity/resistance. Further, FIGS. 7 through 9 show that to achieve a high resistance, the resistive material and a moderate amount of the conductive material should be introduced to the resistor. When too little of either material was introduced to the resistor, a conductive pathway was not formed throughout the resistor and an open circuit was measured. As more of the resistive material was introduced to the resistor, the resistance decreased and approached the resistance of bulk carbon.

It is to be understood that the ranges provided herein include the stated range and any value or sub-range within the stated range, as if such values or sub-ranges were explicitly recited. For example, from about 0.5 vol % to about 1.25 vol % should be interpreted to include not only the explicitly recited limits of from about 0.5 vol % to about 1.25 vol %, but also to include individual values, such as about 0.65 vol %, about 0.7 vol %, about 0.711 vol %, about 0.815 vol %, about 0.874 vol %, etc., and sub-ranges, such as from about 0.55 vol % to about 0.725 vol %, from about 0.65 vol % to about 0.75 vol %, from about 0.675 vol % to about 1.1 vol %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) printing method, comprising:
identifying an electrical conductivity value for a resistor that is to be 3D printed;
based upon the identified electrical conductivity value, selectively applying a predetermined amount of a conductive agent to at least a portion of a build material layer in order to introduce a predetermined volume percentage of a conductive material in the conductive agent to the resistor, wherein the predetermined volume percent of the conductive material ranges from about 0.05 vol % to about 2 vol %, based on a total volume of the resistor;
based upon the identified electrical conductivity value and the predetermined volume percent of the conductive material, selectively applying a predetermined amount of a resistive agent to the at least the portion of the build material layer in order to introduce a predetermined volume percentage of a resistive material in the resistive agent to the resistor; and
exposing the build material layer to electromagnetic radiation, whereby the at least the portion coalesces to form a layer of the resistor.

2. The method as defined in claim 1 wherein:
the resistor includes a plurality of the layers;
the selective application of the conductive agent, the selective application of the resistive agent, and the exposure to the electromagnetic radiation is repeated for each of a plurality of build material layers;
the predetermined amount of the conductive agent selectively applied to each of the plurality of the build material layers is a fraction of a total amount that will introduce the predetermined volume percentage of the conductive material to the resistor; and
the predetermined amount of the resistive agent selectively applied to each of the plurality of the build material layers is a fraction of a total amount that will introduce the predetermined volume percentage of the resistive material to the resistor.

3. A three-dimensional (3D) printing method, comprising:
identifying an electrical conductivity value for a resistor that is to be 3D printed, the electrical conductivity value being within a range of from 1.E+03 S/m to 1.E+05 S/m;
based upon the identified electrical conductivity value, selectively applying a predetermined amount of a conductive agent to at least a portion of a build material layer in order to introduce a predetermined volume percentage of a conductive material in the conductive agent to the resistor, wherein the predetermined volume percent of the conductive material ranges from greater than 2 vol % to about 10 vol %, based on a total volume of the resistor;
based upon the identified electrical conductivity value and the predetermined volume percent of the conductive material, selectively applying a predetermined amount of a resistive agent to the at least the portion of the build material layer in order to introduce a predetermined volume percentage of a resistive material in the resistive agent to the resistor, wherein the predetermined volume percent of the resistive material ranges from 0.05 vol % to about 10 vol %, based on the total volume of the resistor; and
exposing the build material layer to electromagnetic radiation, whereby the at least the portion coalesces to form a layer of the resistor.

4. The method as defined in claim 1, wherein:
the electrical conductivity value is within a range of from 1.E-04 S/m to 1.E-03 S/m;
the predetermined volume percent of the conductive material ranges from about 0.05 vol % to less than 1 vol %, based on the total volume of the resistor; and
the predetermined volume percent of the resistive material ranges from 0.05 vol % to less than 0.37 vol %, based on the total volume of the resistor.

5. The method as defined in claim 1, wherein:
the electrical conductivity value is within a range of from 1.E-03 S/m to 1.E-01 S/m;
the predetermined volume percent of the conductive material ranges from about 0.05 vol % to less than 1 vol %, based on the total volume of the resistor; and
the predetermined volume percent of the resistive material ranges from about 0.37 vol % to about 3 vol %, based on the total volume of the resistor.

6. The method as defined in claim 1, wherein:
the electrical conductivity value is within a range 1.E-02 S/m to 1.E+03 S/m;
the predetermined volume percent of the conductive material ranges from about 1 vol % to about 2 vol %, based on the total volume of the resistor; and
the predetermined volume percent of the resistive material ranges from about 0.19 vol % to about 3 vol %, based on the total volume of the resistor.

7. The method as defined in claim 1, wherein:
the electrical conductivity value is within a range of from 1 S/m to 1.E-04 S/m; and
one of:
the predetermined volume percent of the conductive material ranges from about 0.5 vol % to about 1.25 vol %, based on the total volume of the resistor, and the predetermined volume percent of the resistive material ranges from 0.7 vol % to about 1.75 vol %, based on the total volume of the resistor; or
the predetermined volume percent of the conductive material ranges from about 0.5 vol % to about 1.5 vol %, based on the total volume of the resistor, and the predetermined volume percent of the resistive material ranges from 1.5 vol % to about 1.75 vol %, based on the total volume of the resistor; or
the predetermined volume percent of the conductive material ranges from about 0.5 vol % to about 2.0 vol %, based on the total volume of the resistor, and the predetermined volume percent of the resistive material ranges from 1.70 vol % to about 1.75 vol %, based on the total volume of the resistor.

8. The method as defined in claim 1, wherein:
the electrical conductivity value is within a range of from 1 S/m to 1.E-03 S/m; and
one of:
the predetermined volume percent of the conductive material ranges from about 0.1 vol % to about 0.9 vol %, and the predetermined volume percent of the resistive material ranges from 1.85 vol % to about 3.0 vol %; or
the predetermined volume percent of the conductive material ranges from about 0.5 vol % to about 1.8 vol %, and the predetermined volume percent of the resistive material ranges from 3.0 vol % to about 3.1 vol %.

9. The method as defined in claim 1, wherein the conductive agent consists of the conductive material and a liquid vehicle.

10. The method as defined in claim 1, wherein the conductive material is selected from the group consisting of silver nanoparticles, copper nanoparticles, gold nanoparticles, platinum nanoparticles, nickel nanoparticles, palladium nanoparticles, iron nanoparticles, chromium nanoparticles, aluminum nanoparticles, and combinations thereof.

11. The method as defined in claim 1, wherein the resistive agent consists of the resistive material and a liquid vehicle.

12. The method as defined in claim 1, wherein the resistive material is selected from the group consisting of carbon black, carbon nanotubes, graphene, poly(3,4-ethylenedioxythiophene) polystyrene sulfonate, tin-doped indium oxide nanoparticles, silicon nanoparticles, and combinations thereof.

* * * * *